US007573945B2

(12) United States Patent
Tesfai et al.

(10) Patent No.: US 7,573,945 B2
(45) Date of Patent: *Aug. 11, 2009

(54) SYSTEM AND METHOD FOR JOINT MAXIMAL RATIO COMBINING USING TIME-DOMAIN BASED SIGNAL PROCESSING

(75) Inventors: Yohannes Tesfai, Falls Church, VA (US); Chandra Vaidyanathan, Bethesda, MD (US); Gary L. Sugar, Rockville, MD (US)

(73) Assignee: IPR Licensing, Inc., Wilmington, DE (US)

(*) Notice: Subject to any disclaimer, the term of this patent is extended or adjusted under 35 U.S.C. 154(b) by 912 days.

This patent is subject to a terminal disclaimer.

(21) Appl. No.: 10/707,588

(22) Filed: Dec. 23, 2003

(65) Prior Publication Data

US 2004/0136466 A1 Jul. 15, 2004

Related U.S. Application Data

(63) Continuation of application No. 10/064,482, filed on Jul. 18, 2002, now Pat. No. 6,873,651.

(60) Provisional application No. 60/380,139, filed on May 6, 2002, provisional application No. 60/361,055, filed on Mar. 1, 2002.

(51) Int. Cl.
*H04B 7/02* (2006.01)

(52) U.S. Cl. .................. 375/267; 375/148; 375/219; 375/220; 375/229; 455/63.1; 455/114.2; 455/114.3; 455/501

(58) Field of Classification Search .................. 375/299, 375/347, 144, 260, 267, 146–147, 148, 219–220, 375/229, 295; 455/101, 127.1, 137, 269, 455/334, 63.1, 114.2, 114.3, 501; 708/322; 370/312
See application file for complete search history.

(56) References Cited

U.S. PATENT DOCUMENTS 4,121,221 A 10/1978 Meadows (Continued)

FOREIGN PATENT DOCUMENTS

WO 01/45300 6/2001

(Continued)

OTHER PUBLICATIONS

Bablan et al., "Optimum Diversity Combining and Equalization in Digital Data Transmission with Applications to Cellular Mobile Radio-PartII: Numerical Results", May 1992, IEEE Transactions on Communications, vol. 30, No. 5, pp. 895-907.

(Continued)

*Primary Examiner*—Mohammad H Ghayour
*Assistant Examiner*—Sophia Vlahos
(74) *Attorney, Agent, or Firm*—Volpe and Koenig, P.C.

(57) ABSTRACT

A spatial signal processing system and method are provided to optimize the received signal-to-noise ratio (SNR) at a first radio communication device based on the transmit filter at another radio communication device. Using an estimate of the channel derived from a signal received at one device from another device, an iterative process is provided to determine complex weights for one or more tapped delay-line transmit filters at each of two communication devices that optimize the received SNR.

32 Claims, 8 Drawing Sheets

U.S. PATENT DOCUMENTS

| | | |
|---|---|---|
| 4,599,734 A | 7/1986 | Yamamoto ................... 375/40 |
| 4,639,914 A | 1/1987 | Winters ...................... 370/110 |
| 4,811,420 A | 3/1989 | Avis et al. |
| 5,274,844 A * | 12/1993 | Harrison et al. .............. 455/25 |
| 5,394,435 A | 2/1995 | Weerackody ................ 375/206 |
| 5,437,055 A | 7/1995 | Wheatley, III ............. 455/33.3 |
| 5,457,808 A | 10/1995 | Osawa et al. |
| 5,491,723 A | 2/1996 | Diepstraten ................. 375/267 |
| 5,493,307 A | 2/1996 | Tsujimoto |
| 5,493,722 A | 2/1996 | Gunn et al. |
| 5,507,035 A | 4/1996 | Bantz et al. ................. 455/133 |
| 5,539,832 A | 7/1996 | Weinstein et al. |
| 5,570,366 A | 10/1996 | Baker et al. |
| 5,577,265 A | 11/1996 | Wheatley, III |
| 5,610,617 A | 3/1997 | Gans et al. |
| 5,621,732 A | 4/1997 | Osawa |
| 5,752,173 A | 5/1998 | Tsujimoto |
| 5,761,193 A | 6/1998 | Derango et al. |
| 5,761,237 A | 6/1998 | Petersen et al. |
| 5,771,462 A | 6/1998 | Olsen |
| 5,812,531 A | 9/1998 | Cheung et al. |
| 5,848,105 A | 12/1998 | Gardner et al. |
| 5,854,611 A | 12/1998 | Gans et al. |
| 5,898,679 A | 4/1999 | Brederveld et al. |
| 5,912,921 A | 6/1999 | Warren et al. |
| 5,924,020 A * | 7/1999 | Forssen et al. ............... 455/129 |
| 5,930,248 A | 7/1999 | Langlet et al. |
| 5,982,327 A | 11/1999 | Vook et al. .................. 342/380 |
| 6,008,760 A | 12/1999 | Shattil |
| 6,018,642 A | 1/2000 | Adachi |
| 6,023,625 A | 2/2000 | Myers, Jr. |
| 6,037,898 A | 3/2000 | Parish et al. ................. 342/174 |
| 6,038,272 A | 3/2000 | Golden et al. |
| 6,044,120 A | 3/2000 | Bar-David et al. |
| 6,058,105 A | 5/2000 | Hochwald et al. |
| 6,064,338 A | 5/2000 | Kobayakawa et al. |
| 6,091,934 A | 7/2000 | Berman et al. |
| 6,097,771 A | 8/2000 | Foschini |
| 6,118,788 A | 9/2000 | Kermani |
| 6,122,260 A | 9/2000 | Liu et al. .................... 370/280 |
| 6,124,824 A | 9/2000 | Xu et al. ..................... 342/174 |
| 6,141,393 A | 10/2000 | Thomas et al. |
| 6,141,567 A | 10/2000 | Youssefmir et al. |
| 6,144,651 A | 11/2000 | Rinchiuso et al. |
| 6,144,711 A | 11/2000 | Raleigh et al. |
| 6,147,985 A | 11/2000 | Bar-David et al. |
| 6,157,340 A | 12/2000 | Xu et al. ..................... 342/174 |
| 6,157,843 A | 12/2000 | Derango et al. |
| 6,177,906 B1 | 1/2001 | Petrus ........................ 342/378 |
| 6,185,440 B1 | 2/2001 | Barratt et al. |
| 6,195,045 B1 | 2/2001 | Xu et al. ..................... 342/368 |
| 6,211,671 B1 | 4/2001 | Shattil |
| 6,218,986 B1 | 4/2001 | Yukitomo et al. |
| 6,252,548 B1 | 6/2001 | Jeon |
| 6,252,884 B1 | 6/2001 | Hunter |
| 6,266,528 B1 | 7/2001 | Farzaneh |
| 6,295,026 B1 | 9/2001 | Chen et al. |
| 6,298,092 B1 | 10/2001 | Heath, Jr. et al. |
| 6,307,882 B1 | 10/2001 | Marzetta |
| 6,317,466 B1 | 11/2001 | Foschini et al. |
| 6,327,310 B1 | 12/2001 | Hochwald et al. |
| 6,331,837 B1 | 12/2001 | Shattil |
| 6,349,219 B1 | 2/2002 | Hochwald et al. |
| 6,351,499 B1 | 2/2002 | Paulraj et al. |
| 6,362,781 B1 | 3/2002 | Thomas et al. |
| 6,369,758 B1 | 4/2002 | Zhang ........................ 342/383 |
| 6,370,182 B2 | 4/2002 | Bierly et al. |
| 6,377,631 B1 | 4/2002 | Raleigh |
| 6,377,636 B1 | 4/2002 | Paulraj et al. |
| 6,377,819 B1 | 4/2002 | Gesbert et al. |
| 6,400,699 B1 | 6/2002 | Airy et al. |
| 6,400,780 B1 | 6/2002 | Rashid-Farrokh et al. |
| 6,442,214 B1 | 8/2002 | Boleskei et al. |
| 6,462,709 B1 | 10/2002 | Choi |
| 6,463,295 B1 | 10/2002 | Yun |
| 6,473,467 B1 | 10/2002 | Wallace et al. ............... 375/267 |
| 6,522,898 B1 | 2/2003 | Kohno et al. |
| 6,549,786 B2 | 4/2003 | Cheung |
| 6,570,929 B1 | 5/2003 | Eriksson |
| 6,584,161 B2 | 6/2003 | Hottinen |
| 6,625,162 B2 | 9/2003 | Myojo et al. |
| 6,636,568 B2 | 10/2003 | Kadous ....................... 375/225 |
| 6,646,600 B2 | 11/2003 | Vail et al. |
| 6,684,064 B2 | 1/2004 | Kazakevich et al. |
| 6,687,492 B1 | 2/2004 | Sugar et al. ................ 455/276.1 |
| 6,728,294 B1 | 4/2004 | Kohno et al. |
| 6,728,517 B2 | 4/2004 | Sugar et al. |
| 6,792,033 B1 | 9/2004 | Maruta et al. |
| 6,862,271 B2 | 3/2005 | Medvedev et al. |
| 6,873,606 B2 | 3/2005 | Agrawal et al. |
| 6,873,651 B2 * | 3/2005 | Tesfai et al. .................. 375/219 |
| 6,888,878 B2 | 5/2005 | Prysby et al. |
| 6,895,255 B1 | 5/2005 | Bridgelall |
| 6,901,122 B2 | 5/2005 | Nadgauda et al. |
| 6,904,021 B2 | 6/2005 | Belcea |
| 6,940,917 B2 | 9/2005 | Menon et al. |
| 6,956,907 B2 | 10/2005 | Ketchum |
| 6,961,545 B2 | 11/2005 | Tehrani et al. |
| 6,963,742 B2 * | 11/2005 | Boros et al. .................. 455/424 |
| 6,970,682 B2 | 11/2005 | Crilly et al. |
| 6,980,600 B1 | 12/2005 | Ratnarajah |
| 6,983,167 B2 | 1/2006 | Adachi et al. |
| 7,027,536 B1 * | 4/2006 | Al-Dhahir .................... 375/347 |
| 7,031,368 B1 | 4/2006 | Maruta et al. |
| 7,042,860 B2 | 5/2006 | Kasami et al. |
| 7,155,231 B2 * | 12/2006 | Burke et al. .................. 455/450 |
| 7,224,758 B1 * | 5/2007 | Banister ...................... 375/358 |
| 7,224,942 B2 * | 5/2007 | Dent ............................ 455/69 |
| 7,230,940 B2 | 6/2007 | Fantaske |
| 7,277,409 B1 | 10/2007 | Thermond et al. |
| 7,340,279 B2 | 3/2008 | Chen et al. |
| 7,342,875 B2 | 3/2008 | Hammons et al. |
| 2001/0012764 A1 | 8/2001 | Edwards et al. |
| 2001/0015994 A1 | 8/2001 | Nam |
| 2001/0046255 A1 | 11/2001 | Shattil |
| 2001/0053143 A1 | 12/2001 | Li et al. |
| 2001/0053699 A1 | 12/2001 | McCrady et al. |
| 2002/0001316 A1 | 1/2002 | Hornsby et al. ............. 370/487 |
| 2002/0024975 A1 | 2/2002 | Hendler |
| 2002/0034191 A1 | 3/2002 | Shattil |
| 2002/0039884 A1 | 4/2002 | Raynes et al. |
| 2002/0045435 A1 | 4/2002 | Fantaske |
| 2002/0051430 A1 | 5/2002 | Kasami et al. |
| 2002/0064246 A1 | 5/2002 | Kelkar et al. ................ 375/347 |
| 2002/0067309 A1 | 6/2002 | Baker et al. |
| 2002/0072392 A1 | 6/2002 | Awater et al. |
| 2002/0085643 A1 | 7/2002 | Kitchner et al. |
| 2002/0102950 A1 | 8/2002 | Gore et al. |
| 2002/0111142 A1 | 8/2002 | Klimovitch |
| 2002/0118781 A1 | 8/2002 | Thomas et al. |
| 2002/0122383 A1 | 9/2002 | Wu et al. |
| 2002/0122501 A1 | 9/2002 | Awater et al. |
| 2002/0127978 A1 | 9/2002 | Khatri |
| 2002/0136170 A1 | 9/2002 | Struhsaker et al. .......... 370/280 |
| 2002/0141355 A1 | 10/2002 | Struhsaker et al. .......... 370/280 |
| 2002/0147032 A1 | 10/2002 | Yoon et al. |
| 2002/0158801 A1 | 10/2002 | Crilly, Jr. et al. |
| 2002/0159537 A1 | 10/2002 | Crilly, Jr. |
| 2002/0172186 A1 | 11/2002 | Larsson |
| 2002/0172269 A1 | 11/2002 | Xu |
| 2002/0196842 A1 | 12/2002 | Onggosanusi et al. ....... 375/148 |
| 2003/0002450 A1 | 1/2003 | Jalali et al. .................. 370/294 |
| 2003/0022693 A1 | 1/2003 | Gerogiokas et al. |
| 2003/0032423 A1 | 2/2003 | Boros et al. .................. 455/423 |

| | | |
|---|---|---|
| 2003/0048761 A1 | 3/2003 | Jarett |
| 2003/0108117 A1 | 6/2003 | Ketchum et al. ............ 375/295 |
| 2003/0114108 A1 | 6/2003 | Frecassetti et al. |
| 2003/0125090 A1 | 7/2003 | Zeira ......................... 455/562 |
| 2003/0139194 A1 | 7/2003 | Onggosanusi et al. ....... 455/506 |
| 2003/0157954 A1 | 8/2003 | Medvedev et al. |
| 2003/0181165 A1 | 9/2003 | Sugar et al. |
| 2004/0072546 A1 | 4/2004 | Sugar et al. |
| 2004/0104839 A1* | 6/2004 | Velazquez et al. ........ 342/357.1 |
| 2005/0192048 A1 | 9/2005 | Bridgelall |
| 2007/0117513 A1 | 5/2007 | Kasami et al. |

FOREIGN PATENT DOCUMENTS

| | | |
|---|---|---|
| WO | 02/03568 | 1/2002 |
| WO | WO 02/03568 | 1/2002 |
| WO | WO 01/45300 | 6/2002 |

OTHER PUBLICATIONS

Chuah et al., "Capacity of Multi-Antenna Array Systems in Indoor Wireless Environment", Nov. 1998, IEEE Globecom.

Wallace et al., "Experimental Characterization of the MIMO Wireless Channel: Data Acquisition and Analysis", Feb. 27, 2002, Department of Electrical and Computer Engineering, Brigham Young University.

Love et al., "Equal Gain Transmission in Multiple-Input Multiple-Output Wireless Systems", Nov. 2002, Proceedings of IEEE Globecom, pp. 1124-1128.

Vaidyanathan et al., "The Role of Lossless Systems in Modern Digital Signal Processing: A Tutorial," IEEE Transactions on Education, vol. 32, Aug. 1989, pp. 181-197.

Raleigh et al., "Spatio-Temporal Coding for Wireless Communication," IEEE Transactions on Communications, vol. 46., No. 3, Mar. 1998, pp. 357-366.

Jungnickel et al., "Performance of a MIMO System with Overlay Pilots," IEEE GlobeCom 2001, pp. 594-598.

BLAST High-Level Overview, Lucent Technologies, Jul. 18, 2000.

Golden et al., "Detection Algorithm and Initial Laboratory Results Using V-BLAST space-time communication architecture," Electronic Letters, Jan. 7, 1999, vol. 35, No. 1.

Golden et al., "V-BLAST: A High Capacity Space-Time Architecture for the Rich-Scattering Wireless Channel," Bell Laboratories, Lucent Technologies, Proc. Int'l Symposium on Advanced Radio Technologies, Builder, CO, Sep. 10, 1998.

Wolniansky et al., "V-BLAST: An Architecture for Realizing Very High Data Rates Over the Rich-Scattering Wireless Channel," Proc. ISSSE-98, Pisa, Italy, Sep. 29, 1998.

Chizhik et al., "Keyholes, Correlations, and Capacities of Multielement Transmit and Receiver Antennas," IEEE Transactions on Wireless Communications, vol. 1, No. 2, Apr. 2002, pp. 361-368.

Junqiang et al., "Spatial Multiuser Access with MIMO Smart Antennas for OFDM Systems," IEEE VTC '2001, Sep. 2001, pp. 1553-1557.

Stridh et al., "MIMO Channel Capacity on a Measured Indoor Radio Channel at 5.8 GHz," Proc. Of the Asilomar Conf. on Signals, Systems & Computers, vol. 1, Oct. 2000, pp. 733-737.

Jungnickel et al., "A MIMO WLAN Based on Linear Channel Inversion," IEE Seminar-MIMO Communication Systems from Concept to Implementation, Dec. 2001, pp. 20/1-20/6.

Stridh et al., "Spatial Characterization of Indoor Radio Channel Measurements at 5 GHz," SAM '2000, Mar. 2000, pp. 58-62.

Irner, Ralf et al., "MISO Concepts for Frequency-Selective Channels," 2002 International Zurich Seminar on Broadband Communications Access, Feb. 19-21, 2002.

Choi, Ruly Lai-U et al., "MISO CDMA Transmission with Simplified Receiver for Wireless Communication Handsets," IEEE Transactions on Communications, vol. 49, No. 5, May 2002.

Meyer-Ottens, Sven et al., "Downlink Beamforming for W-CDMA Using Feedback and Interference Estimate," Mar. 9, 2001.

Brunner, Christopher et al., "Downlink Beamforming for WCDMA Based on Uplink Channel Parameters," Proc. EPMCC 1999, pp. 375-380, Mar. 1999.

Yang, Jian et al., "On Joint Transmitter and Receive Optimization for Multiple-Input-Multiple-Output (MIMO) Transmission Systems," IEEE Transactions on Communications, vol. 42, No. 12, Dec. 1994.

Ivrlac, Michel et al., "On Channel Capacity of Correlated MIMO Channels," ITG Fokusprojekt: Mobilkommunikation "Systeme mit intelligenten Antennen", Ilmenau, 2001.

Iserte, Antonio Pascual et al., "Pre-and Post-Beamforming in MIMO Channels Applied to HIPERLAN/2 and OFDM," IST Summit 2001 (IST Mobile Communications Summit), Sep. 2001.

Iserte, Antonio Pascual et al., "Joint Beamforming Strategies in OFDM-MIMO Systems," ICASSP 2002 (IEEE International Conference on Acoustics, Speech and Signal Processing), May 2002.

Lee, Dennis et al., "Antenna Diversity for an OFDM System in a Fading Channel," Proceeding of IEEE MILCOM 1999, Nov. 1999, pp. 1104-1109.

Jakes, William C., "Microwave Mobile Communications," Copyright 1974, pp. 313-320 and 489-498.

Yeh, Y.S., "An Analysis of Adaptive Retransmission Arrays in a Fading Environment," The Bell System Technical Journal, Oct. 1970, pp. 1811-1825.

Morgan, Samuel P., "Interaction of Adaptive Antenna Arrays in an Arbitrary Environment," The Bell System Technical Journal, Jan. 1965, pp. 23-47.

Aziz, Abdul M.K. et al., "Indoor Throughput and Range Improvements using Standard Compliant AP Antenna Diversity in IEEE 802.11a and ETSI HIPERLAN/2," Vehicular Technology Conference, 2002, VTC 2001, Oct. 7-11, 2001, IEEE VTS $54^{th}$, vol. 4, pp. 2294-2298.

Iserte, Antonio Pascual et al., "Iterative Algorithm for the Estimation of Distributed Sources Localization Parameters," SSP 2001 ($11^{th}$ IEEE Workshop on Statistical Signal Processing), Aug. 2001.

Heath, Robert W., Jr., "A Simple Scheme for Transmit Diversity Using Partial Channel Feedback," Signals, Systems & Computers, Conference Record of the Thirty-Second Asilomar Conference Nov. 1-4, 1998, vol. 2, pp. 1073-1078.

"Lucent's 'BLAST' chips to Take Off in Wireless Market," Oct. 16, 2002, Semiconductor Business News.

"Lucent Technologies' Chips Poised to Bring 'BLAST' Multiple Input/Multiple Output Technology to Laptops, PDA's and Other Mobile Devices," Oct. 16, 2002, Lucent Technologies.

Iserte et al., "Pre-and Post-Beamforming in MIMO Channels Applied to HIPERLAN/2 and OFDM", IST Summit 2001, IST Mobile Communications Summit, Sep. 2001.

Iserte et al., "Joint Beamforming Strategies in OFDM-MIMO Systems", ICASSP 2002, IEEE International Conference on Acoustics, Speech and Signal Processing, May 2002.

Lee et al., "Antenna Diversity for an OFDM System in a Fading Channel", Proceeding of IEEE MILCOM 1999, Nov. 1999, pp. 1104-1109.

Jakes, "Microwave Mobile Communications", Copyright 1974, pp. 313-320 and pp. 489-498.

Briesemeister et al., "Role-Based Multicast in Highly Mobile but Sparsely Connect Ad-Hoc Networks"; First Annual Workshop on Mobile AD Hoc Networking & Computing; pp. 45-50; Aug. 2000.

Bablan et al., "Optimum Diversity Combining and Equalization in Digital Data Transmission with Applications to Cellular Mobile Radio-Part II: Numerical Results"; May 1992; IEEE Transactions on Communications, vol. 30, No. 5; pp. 895-907.

Brunner et al., "Downlink Beamforming for WCDMA Based on Uplink Channel Parameters"; Proceedings of $3^{rd}$ European Personal Mobile Conference (EPMCC '99), Mar. 1999, pp. 375-380.

Yeh, "An Analysis of Adaptive Retransmission Arrays in a Fading Environment", The Bell System Technical Journal, Oct. 1970, pp. 1811-1825.

Morgan, "Interaction of Adaptive Antenna Arrays in an Arbitrary Environment", The Bell System Technical Journal, Jan. 1965, pp. 23-47.

Stridh et al., "MIMO Channel Capacity on a Measured Indoor Radio Channel at 5.8 GHz", Proc. of the Asilomar Conf. on Signals, Systems & Computers, vol. 1, Oct. 2000, pp. 733-737.

Aziz et al., "Indoor Throughput and Range Improvements Using Standard Complaint AP Antenna Diversity in IEEE 802.11a and ESTI HIPERLAN/2", Vehicular Technology Conference, 2002, VTC 2001, Oct. 7-11, 2001, IEEE VTS 54th, vol. 4, pp. 2294-2298.

Iserte et al., "Iterative Algorithm for the Estimation of Distributed Sources Localization Parameters", SSP 2001, 11th IEEE Workshop on Statistical Signal Processing, Aug. 2001.

Vaidyanathan et al., "The Role In Lossless Systems in Modern Digital Signal Processing: A Tutorial", IEEE Transactions on Education, vol. 32, Aug. 1989, pp. 181-197.

Raleigh et al., "Spatio-Temporal Coding for Wireless Communication", IEEE Transactions on Communications, vol. 46, No. 3, Mar. 1998, pp. 357-366.

Jungnickel et al., "Performance of a MIMO System with Overlay Pilots", IEEE GlobeCom 2001, pp. 594-598.

"BLAST High-Level Overview", Lucent Technologies, Jul. 18, 2000.

Golden et al., "Detection Algorithm and Initial Laboratory Results Using V-BLAST Space-Time Communication Architecture", Electronic Letters, Jan. 7, 1999, vol. 35, No. 1.

Golden et al., "V-BLAST: A High Capacity Space-Time Architecture for the Rich-Scattering Wireless Channel", Bell Laboratories, Lucent Technologies, Proc. Int'l Symposium on Advanced Radio Technologies, Boulder, CO, Sep. 10, 1998.

Junqiang et al., "Spatial Multiuser Access with MIMO Smart Antennas for OFDM Systems", IEEE VTC 2001, Sep. 2001, pp. 1553-1557.

Jungnickel et al., "A MIMO WLAN Based on Linear Channel Inversion", IEE Seminar-MIMO Communication Systems from Concept TO Implementation, Dec. 2001, pp. 20/1-20/6.

Stridh et al., "Spatial Characterization of Indoor Radio Channel Measurements at 5 GHz", SAM 2000, Mar. 2000, pp. 58-62.

Irmer et al., "MISO Concepts for Frequency-Selective Channels", 2002 International Zurich Seminar on Broadband Communications Access, Feb. 19-21, 2002.

Choi et al., "MISO CDMA Transmission with Simplified Receiver for Wireless Communication Handsets", IEEE Transactions on Communications, vol. 49, No. 5, May 2002.

Meyer-Ottens, et al. "Downlink Beamforming for W-CDMA Using Feedback and Interference Estimate", Mar. 9, 2001.

Yang et al., "On Joint Transmitter and Receive Optimization for Multiple-Input-Multiple-Output (MIMO) Transmission Systems", IEEE Transactions on Communications, vol. 42, No. 12, Dec. 1994.

Ivrlac et al., "On Channel Capacity of Correlated MIMO Channels", ITG Fokusprojekt: Mobilkommunikation "Systeme mit Intelligenten Antennen", Ilmenau, 2001.

Wallace et al., "Experimental Characterization of the MIMO Wireless Channel: Data Acquisition and Analysis", Feb. 27, 2002, Department of Electrical and Computer Engineering, Brigham Young University.

Lucent Technologies, "Lucent Technologies: Chips Poised to Bring 'BLAST' Multiple Input/Multiple Output Technology to Laptops, PDAs and Other Mobile Devices", Oct. 16, 2002, lucent.com.

"Lucent's 'BLAST' Chips to Take Off in Wireless Market", EETimes.com, Oct. 16, 2002.

Heath et al., "A Simple Scheme for Transmit Diversity Using Partial Channel Feedback", Signals, Systems & Computers, Conference Record of the Thirty-Second Asilomar Conference, Nov. 1-4, 1998; vol. 2; pp. 1073-1078.

Chiu et al., "OFDM Receiver Design", EE225C, Fall 2000, University of California, Berkeley.

Sanchez et al., "CSMA/CA Beam Forming Antennas in Multi-hop Packet Radio", Proc. For Swedish Workshop on Wireless Ad-Hoc Networks, Mar. 5-6, 2001.

Ariyavisitakul et al., "Optimum Space-Time Processors With Dispersive Interference—United Analysis And Required Filter Span", 1999 IEEE International Conference On Communications, vol. 2, pp. 1244-1249, (1999).

Chiu et al., "OFDM Receiver Desing", EE225C, Fall 2000, University of California, Berkeley.

Golub et al., *Matrix Computation*, "7.3 Power Iterations", The Johns Hopkins University Press, Second Edition, pp. 351, (1983).

LAN MAN Standards Committee Of The IEEE Computer Society, "Information Technology—Telecommunications And Information Exchange Between Systems—Local And Metropolitan Area Networks—Specific Requirements—Part 11: Wireless LAN Medium Access Control (MAC) And Physical Layer (PHY) Specifications", ANSI/IEEE Std 802.11, 1999 Edition (R2003), (Reaffirmed Jun. 12, 2003).

Li et al., "Adaptive Antenna Arrays For OFDM Systems With Cochannel Interference", IEEE Transactions On Communications, vol. 47, No. 2, pp. 217-229, (Feb. 1999).

Narula et al., "Efficient Use Of Side Information in Multiple-Antenna Data Transmission Over Fading Channels", IEEE Journal On Selected Areas in Communications, vol. 16, No. 8, pp. 1423-1436, (Oct. 1998).

Onggosanusi et al., "Performance Analysis Of Closed-Loop Transmit Diversity In The Presence Of Feedback Delay", IEEE Transactions On Communications, vol. 49, No. 9, pp. 1618-1630, (Sep. 2001).

Wennström et al., "On The Optimality And Performance Of Transmit And Receive Space Diversity In MIMO Channels", IEEE Seminar on Communications Systems from Concept to Implementations, (Dec. 12, 2001).

Yang et al., "Joint Transmitter—Receiver Optimization For Multi-Input Multi-Output Systems With Decision Feedback", IEEE Transactions On Information Theory, vol. 40, No. 5, pp. 1334-1347, (Sep. 1994).

"BLAST High-Level Overview", Lucent Technologies, Jul. 18, 2000.

Lucent's 'BLAST Chips to Take Off in Wireless Market', EETimes.com, Oct. 16, 2002.

Ariyavisitakul et al., "Optimum Space-Time Processors With Dispersive Interference - Unified Analysis and Required Filter Span", 1999 IEEE International Conference On Communications, vol. 2, pp. 1244-1249, (1999).

Aziz et al., "Indoor Throughput and Range Improvements Using Standard Complaint AP Antenna Diversity in IEEE 802.11a and ETSI HIPERLAN/2", Vehicular Technology Conference, 2002, VTC 2001, Oct. 7-11, 2001, IEEE VTS 54th, vol. 4, pp. 2294-2298..

BabIan et al., " Optimum Diversity Combining and Equalization in Digital Data Transmission with Applications to Cellular Mobile Radio-Part II: Numerical Results"; May 1999; IEEE Transactions on Communications, vol. 30, No. 5; pp. 895-907.

Briesemeister et al., "Role-Based Multicast in Highly Mobile but Sparsely Connect Ad-Hoc Networks"; First Annual Workshop on Mobile Ad Hoc Networking & Computing; pp. 45-50; Aug. 2000.

Brunner et al., "Downlink Beamforming for WCDMA Based on Uplink Channel Parameters"; Proceedings of 3rd European Personal Mobile Conference (EPMCC '99), Mar. 1999, pp. 375-380.

Chiu et al., "OFDM Receiver Design", EE225C, Fall 2000, University of California, Berkeley.

Chizhik et al., "Keyholes, Correlations, and Capacities of Multielement Transmit and Receiver Antennas", IEEE Transactions on Wireless Communications, vol. 1, No. 2, Apr. 2002, pp. 361-368.

Choi et al., "MISO CDMA Transmission with Simplified Receiver for Wireless Communication Handsets", IEEE Transactions on Communications, vol. 49, No. 5, May 2002.

Chuah et al., "Capacity of Multi-Antenna Array Systems in Indoor Wireless Environment", Nov. 1998, IEEE Globecom.

Golden et al., "Detection Algorithm and Initial Laboratory Results Using V-BLAST Space-Time Communication Architecture", Electronic Letters, Jan. 7, 1999, vol. 35, No. 1.

Golden et al., "V-BLAST: A High Capacity Space-Time Architecture for the Rich-Scattering Wireless Channel", Bell Laboratories, Lucent Technologies, Proc. Int'l Symposium on Advanced Radio Technologies, Boulder, CO, Sep. 10, 1998.

Golub et al., *Matrix Computation*, "7.3 Power Iterations", The Johns Hopkins University Press, Second Edition, pp 351, (1983).

Heath et al., "A Simple Scheme for Transmit Diversity Using Partial Channel Feedback", Signals, Systems & Computers, Conference Record of the Thirty-Second Asilomar Conference, Nov. 1-4, 1998; vol. 2; pp. 1073-1078.

Irmer et al., "MISO Concepts for Frequency-Selective Channels", 2002 International Zurich Seminar on Broadband Communications Access, Feb. 19-21, 2002.

Iserte et al., "Iterative Algorithm for the Estimation of Distributed Sources Localization Parameters", SSP 2001, 11th IEEE Workshop on Statistical Signal Processing, Aug. 2001.

Iserte et al., "Joint Beamforming Strategies in OFDM-MIMO Systems", ICASSP 2002, IEEE International Conference on Acoustics, Speech and Signal Processing, May 2002.

Iserte et al., "Pre-and Post-Beamforming in MIMO Channels Applied to HIPERLAN/2 and OFDM", IST Summit 2001, IST Mobile Communications Summit, Sep. 2001.

Ivrlac et al., "On Channel Capacity of Correlated MIMO Channels", ITG Fokusprojekt: Mobilkommunikation "Systeme mit Intelligenten Antennen", lienau, 2001.

Jakes, "Microwave Mobile Communications", Copyright 1974, pp. 313-320 and pp. 489-498.

Jungnickel et al., "A MIMO WLAN Based on Linear Channel Inversion", IEE Seminar-MIMO Communication Systems from Concept TO Implementation, Dec. 2001, pp. 20/1-20/6.

Jungnickel et al., Performance of a MIMO System with Overlay Pilots', IEEE GlobeCom 2001, pp. 594-598.

Junqiang etal., "Spatial Multiuser Access with MIMO Smart Antennas for OFDM Systems", IEEE VTC 2001, Sep. 2001, pp. 1553-1557.

LAN MAN Standards Committee of the IEEE Computer Society, "Information Technology - Telecommunications and Information Exchange Between Systems - Local and Metropolitan Are Networks - Specific Requirements - Part 11: Wireless LAN Medium Access Control (MAC) and Physical Layer (PHY) Specifications", ANSI/IEEE Std 802.11, 1999 Edition (R2003), (Reaffirmed Jun. 12, 2003).

Lee et al., "Antenna Diversity for an OFDM System in a Fading Channel", Proceeding of IEEE MILCOM 1999, Nov. 1999, pp. 1104-1109.

Li et al., "Adaptive Antenna Arrays For OFDM Systems With Cochannel Interference", IEEE Transactions On Communications, vol. 47, No. 2, pp. 217-229, (Feb. 1999).

Love et al., "Equal Gain Transmission in Multiple-Input Multiple-Output Wireless Systems", Nov. 2002, Proceedings of IEEE Globecom, pp. 1124-1128.

Lucent Technologies, "Lucent Technologies: Chips Poised to Bring 'BLAST' Multiple Input/Multiple Output Technology to Laptops, PDAs and Other Mobile Devices", Oct. 16, 2002, lucent.com.

Meyer-Ottens, et al. "Downlink Beamforming for W-CDMA Using Feedback and Interference Estimate", Mar. 9, 2001.

Morgan, "Interaction of Adaptive Antenna Arrays in an Arbitrary Environment", The Bell System Technical Journal, Jan. 1965, pp. 23-47.

Narula et al., "Efficient Use Of Side Information in Multiple-Antenna Data Transmission Over Fading Channels", IEEE Journal On Selected Areas in Communications, vol. 16, No. 8, pp. 1423-1436, (Oct. 1998).

Onggosanusi et al., "Performance Analysis Of Closed-Loop Transmit Diversity In The Presence Of Feedback Delay", IEEE Transactions On Communications, vol. 49, No. 9, pp. 1618-1630, (Sep. 2001).

Raleigh et al., "Spatio-Temporal Coding for Wireless Communication", IEEE Transactions on Communications, vol. 46, No. 3, Mar. 1998, pp. 357-366.

Sanchez et al., "CSMA/CA Beam Forming Antennas in Multi-hop Packet Radio", Proc. For Swedish Workshop on Wireless Ad-Hoc Networks, Mar. 5-6, 2001.

Stridh et al., "MIMO Channel Capacity on a Measured Indoor Radio Channel at 5.8 GHz", Proc. of the Asilomar Conf. on Signals, Systems & Computers, vol. 1, Oct. 2000, pp. 733-737.

Stridh et al., "Spatial Characterization of Indoor Radio Channel Measurements at 5 GHz", SAM 2000, Mar. 2000, pp. 58-62.

Vaidyanathan et al., "The Role In Lossless Systems in Modern Digital Signal Processing: A Tutorial", IEEE Transactions on Education, vol. 32, Aug. 1989, pp. 181-197.

Wallace et al., "Experimental Characterization of the NIMO Wireless Channel: Data Acquisition and Analysis", Feb. 27, 2002, Department of Electrical and Computer Engineering, Brigham Young University.

Wennström et al., "On The Optimality And Performance Of Transmit And Receive Space Diversity In MIMO Channels", IEEE Seminar on Communications Systems from Concept to Implementations, (Dec. 12, 2001).

Wolniansky et al., "V-BLAST: An Architecture for Realizing Very High Data Rates Over the Rich-Scattering Wireless Channel", Proc. ISSSE-98, Pisa, Italy, Sep. 29, 1998.

Yang et al., "Joint Transmitter—Receiver Optimization For Multi-Input Multi-Output Systems With Decision Feedback", IEEE Transactions On Information Theory, vol. 40, No. 5, pp. 1334-1347, (Sep. 1994).

Yang et al., "On Joint Transmitter and Receive Optimization for Multiple-Input-Multiple-Output (MIMO) Transmission Systems", IEEE Transactions on Communications, vol. 42, No. 12, Dec. 1994.

Yeh, "An Analysis of Adaptive Retransmission Arrays in a Fading Environment", The Bell System Technical Journal, Oct. 1970, pp. 1811-1825.

\* cited by examiner

FIG. 2

$$\underline{h}^{ij} = \left(h_0^{ij}, h_1^{ij}, \ldots, h_{L-1}^{ij}\right)^T$$

Channel Response Matrix $$H_{ij} = \begin{bmatrix} h_0^{ij} & 0 & \cdots & 0 & 0 & \cdots & 0 \\ h_1^{ij} & h_0^{ij} & \cdots & 0 & 0 & \cdots & 0 \\ \cdot & h_1^{ij} & \cdots & \cdot & \cdot & \cdots & \cdot \\ \cdot & \cdot & \cdots & h_0^{ij} & 0 & \cdots & 0 \\ h_{L-1}^{ij} & \cdot & \cdots & h_1^{ij} & h_0^{ij} & \cdots & \cdot \\ 0 & h_{L-1}^{ij} & \cdots & \cdot & \cdot & \cdots & \cdot \\ 0 & 0 & \cdots & \cdot & \cdot & \cdots & h_0^{ij} \\ \cdot & \cdot & \cdots & h_{L-1}^{ij} & \cdot & \cdots & h_1^{ij} \\ 0 & 0 & \cdots & 0 & 0 & \cdots & \cdot \\ 0 & 0 & \cdots & 0 & 0 & \cdots & h_{L-1}^{ij} \end{bmatrix}$$

$$= \begin{bmatrix} \underline{h}^{ij} & 0 & 0 & \cdots & 0 \\ 0 & \underline{h}^{ij} & 0 & \cdots & 0 \\ 0 & 0 & \underline{h}^{ij} & \cdots & 0 \\ \cdot & \cdot & \cdot & \cdots & \cdot \\ 0 & 0 & 0 & \cdots & \underline{h}^{ij} \end{bmatrix}$$

Channel Response Vector

FIG. 3

$$\mathbf{W}_{T,D1} = \begin{bmatrix} \mathbf{W}_{T,D1}^1 \\ \mathbf{W}_{T,D1}^2 \\ \cdot \\ \cdot \\ \mathbf{W}_{T,D1}^N \end{bmatrix}$$

Transmit Antenna Filter Super Matrix $$\mathbf{W}_{T,D1}^i = \begin{bmatrix} w_{T,D1,0}^i & 0 & 0 & \cdots & 0 & 0 & \cdots & 0 \\ w_{T,D1,1}^i & w_{T,D1,0}^i & 0 & \cdots & 0 & 0 & \cdots & 0 \\ \cdot & w_{T,D1,1}^i & w_{T,D1,0}^i & & & & & \\ \cdot & \cdot & \cdot & & & & & \\ w_{T,D1,LTD1-1}^i & \cdot & \cdot & & w_{T,D1,0}^i & 0 & \cdots & 0 \\ 0 & w_{T,D1,LTD1-1}^i & \cdot & & w_{T,D1,1}^i & w_{T,D1,0}^i & \cdots & 0 \\ \cdot & \cdot & \cdot & & \cdot & \cdot & & \cdot \\ 0 & 0 & \cdot & & \cdot & \cdot & & w_{T,D1,0}^i \\ \cdot & \cdot & \cdot & & w_{T,D1,LTD1-1}^i & \cdot & & \cdot \\ 0 & 0 & \cdots & 0 & 0 & 0 & \cdots & w_{T,D1,LTD1-1}^i \end{bmatrix}$$

Transmit Filter Matrix for Antenna i $$\underline{w}_{T,D1} = \begin{bmatrix} \underline{w}_{T,D1}^1 \\ \underline{w}_{T,D1}^2 \\ \underline{w}_{T,D1}^3 \\ \cdot \\ \cdot \\ \underline{w}_{T,D1}^N \end{bmatrix}$$

Transmit Filter Super Vector for N Antennas of First Communication Device (D1)

$$\underline{w}_{T,D1}^i = \begin{bmatrix} w_{T,D1,0}^i \\ w_{T,D1,1}^i \\ w_{T,D1,2}^i \\ \cdot \\ \cdot \\ w_{T,D1,LTD1-1}^i \end{bmatrix} \Bigg\} LTD1$$

Transmit Filter Sub-Vector for Antenna i of D1

400

SYSTEM AND METHOD FOR JOINT MAXIMAL RATIO COMBINING USING TIME-DOMAIN BASED SIGNAL PROCESSING

This application is a continuation of U.S. application Ser. No. 10/064,482 filed Jul. 18, 2002, pending, which in turn claims priority to U.S. Provisional Application No. 60/361,055, filed Mar. 1, 2002, and to U.S. Provisional Application No. 60/380,139, filed May 6, 2002. The entirety of each of these prior applications is incorporated herein by reference.

RELATED APPLICATIONS

This application is related to commonly assigned and co-pending U.S. Non-Provisional application Ser. No. 10/174,728 filed Jun. 19, 2002 and entitled "SYSTEM AND METHOD FOR ANTENNA DIVERSITY USING JOINT MAXIMAL RATIO COMBINING" and to commonly assigned and co-pending U.S. Non-Provisional application Ser. No. 10/174,689 filed Jun. 19, 2002, and entitled "SYSTEM AND METHOD FOR ANTENNA DIVERSITY USING EQUAL POWER GAIN JOINT MAXIMAL RATIO COMBINING."

BACKGROUND OF INVENTION

The present invention is directed to a joint temporal and spatial antenna processing scheme useful in wireless communication applications, such as short-range wireless applications.

Antenna diversity schemes are well known techniques to improve the performance of radio frequency (RF) communication between two RF devices. Types of antenna diversity schemes include antenna selection diversity and maximal ratio combining. In an antenna selection diversity scheme, a radio communication device selects one of N (e.g., two) antennas for transmission to a particular communication device based on which of its N antennas best received a signal from that radio communication device. On the other hand, maximal ratio combining schemes involve scaling the signal to be transmitted with a complex antenna weight associated with a corresponding one of a plurality of antennas. A signal received by a plurality of antennas can also be weighted by a plurality of complex receive antenna weights. Selection of the antenna weights to optimize communication between two communication devices determines the performance of maximal ratio combining schemes.

A joint maximal ratio combining antenna processing technique is one in which a first communication device, having a plurality of antennas, weights a signal to be transmitted by its antennas to a second communication device also having a plurality of antennas. The second communication device weights and combines the received signals received by its antennas. The transmit weights and receive weights are determined to optimize the link margin, e.g., optimize the signal-to-noise ratio of signals received by one device from the other. Techniques related to joint maximal ratio combining, also called composite beamforming (CBF), are the subject matter of above-identified commonly assigned co-pending application. These techniques significantly extend the range of communication between the two communication devices.

An approach is desired for a joint maximal ratio combining technique that requires relatively low complexity computations be performed in a communication device.

SUMMARY OF INVENTION

A spatial signal processing system and method are provided to optimize the received signal-to-noise ratio (SNR) at a radio communication device based on the transmit filter at another radio communication device. An iterative process is provided to determine complex weights for tapped delay-line transmit filters at each of two communication devices that optimize the received SNR. When one communication device receives a signal from another device, it generates a receive filter matrix from a signal received by its one or more antennas. The receive filter matrix is comprised of one or more sub-matrices each being a convolution matrix derived from a receive filter sub-vector, wherein each receive filter sub-vector defines one or more complex weights associated with a receive tapped-delay line filter for the one or more antennas. The receiving device computes the eigenvector corresponding to the maximum eigenvalue of a product of the receive filter matrix and a Hermitian of the receive filter matrix. This eigenvector is the principal eigenvector of that matrix multiplication product. The principal eigenvector is comprised of one or more sub-vectors each having a length corresponding to a number of taps of a transmit tapped-delay line filter associated with the one or more antennas. From the one or more sub-vectors of the principal eigenvector one or more transmit filter sub-vectors that form a transmit filter vector are determined. Each transmit filter sub-vector corresponds to the one or more antennas of the second communication device and defining one or more complex weights associated with the transmit tapped-delay line filter for the one or more antennas of the second communication device. The transmit filter vector is used by that device when transmitting a signal back to the other device.

The two communication devices will ultimately converge to transmit filter vectors that optimize the received SNR at the output of the receive filters of the other device. The range of communication, i.e., distance between the devices, is significantly increased using the techniques described herein.

The above and other objects and advantages will become more readily apparent when reference is made to the following description taken in conjunction with the accompanying drawings.

BRIEF DESCRIPTION OF DRAWINGS

FIG. 2 is a diagram showing an exemplary channel matrix.

FIG. 3 is a diagram showing exemplary transmit filter vectors.

DETAILED DESCRIPTION

Figure 1:
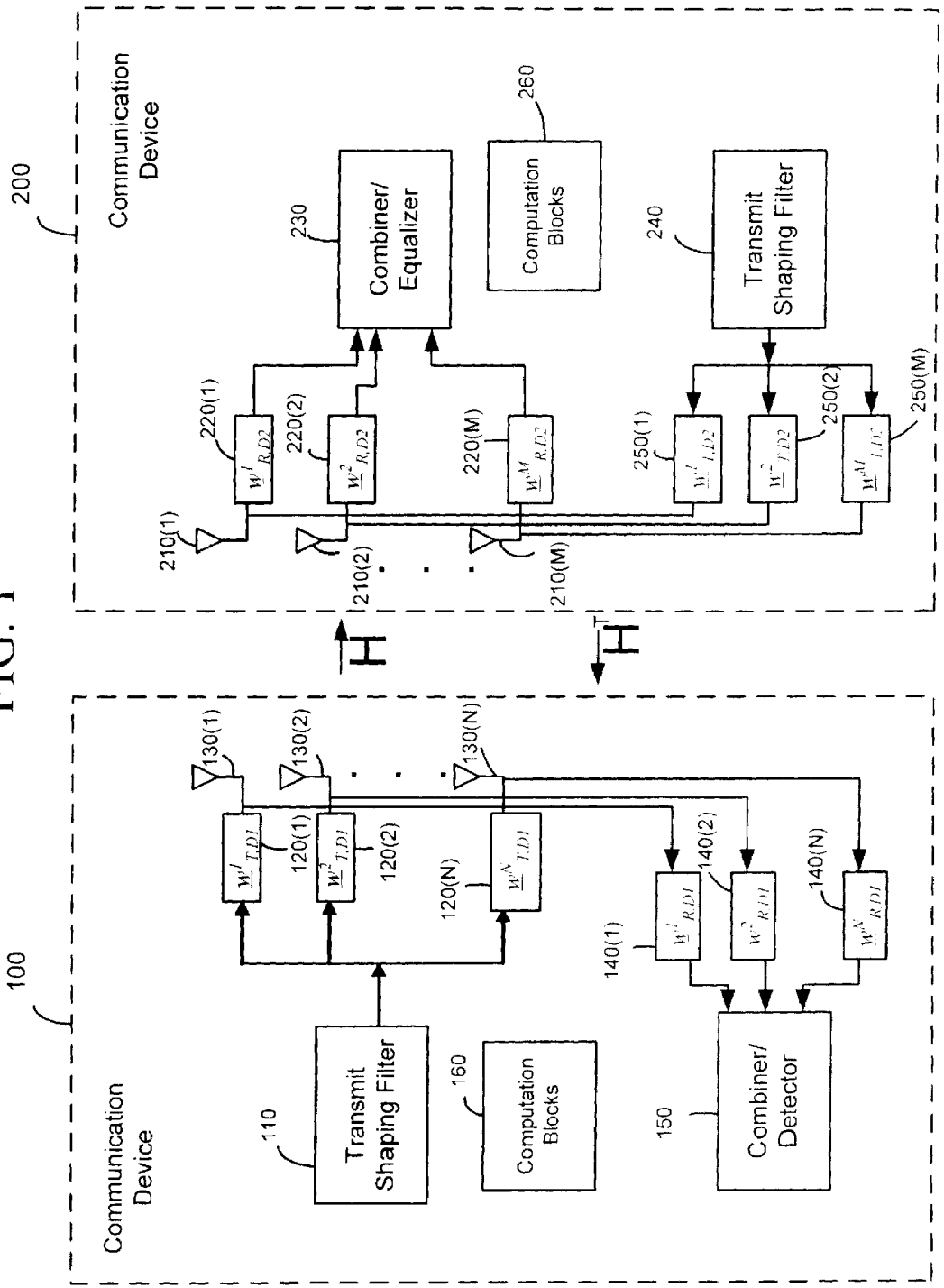
FIG. 1 is a block diagram of two communication devices performing time-domain based composite beamforming.

Referring first to FIG. 1, two radio communication devices 100 and 200 are shown that communicate with each other across a wireless transmission channel that can be defined by a channel matrix H(or $H^T$, where $^T$ denotes the transpose operator). When the signal-to-noise ratio (SNR) at the output of the receive filters of one device is optimized with respect to the transmit filters at the other device, the ideal transmit filter vector $w_T$ is given by the eigenvector corresponding to the maximum eigenvalue $e_{max}$ of ($H^H$ H), which is the principal eigenvector of ($H^H$ H), where $^H$ denotes the Hermitian operator. This ideal case assumes that the devices have direct knowledge of the channel, obtained from training sequences or from a separate signal containing channel information that is transmitted from one device to the other.

In the drawings, vectors are underlined (and italicized) and matrices are capitalized and bolded (and italicized), whereas in the text, these quantities are in most cases indicated as either a vector or a matrix.

Described below is a system and method to optimize the SNR at the output of the receive filters of one device (hereinafter referred to as the received SNR) with respect to tapped delay-line transmit filters at another device without direct knowledge of the channel between the devices. Using an estimate of the channel obtained from a signal received at one device from another device, an iterative process is provided that determines the transmit filters at the communication device at each iteration. The transmit filters at each device converge to a received SNR that is within 1-2 dB of the ideal case SNR in about 2 to 3 iterations for more than 90% of channel realizations.

With this background, communication device 100 includes, among other components, a transmit shaping filter 110, a plurality of transmit antenna filters 120(1)-120(N) and N plurality of antennas 130(1) to 130(N). There is a transmit antenna filter 120(i) associated with a corresponding antenna 130(i), where i is the antenna index, for i=1 to N. Each transmit antenna filter 120(i) is, for example, a tapped delay-line filter having a number of taps. For each tap of the tapped delay-line filter, there is a complex weight having a magnitude component and a phase component. For example, a single tap delay-line filter has a single weight, and therefore a flat or constant magnitude and a flat or constant phase response across frequency. The characteristic of each transmit filter 120 is defined by a transmit filter sub-vector $w^i_{T,D1}$, and the length of the transmit filter sub-vector corresponds to the number of taps of the transmit antenna filter 120(i). The entry in each sub-vector defines the corresponding tap weight for the delay-line filter. The transmit filter subvectors can be grouped together to form a transmit filter vector. The filter vector and sub-vectors will be described further hereinafter.

Similarly, for purposes of processing a received signal, the communication device 100 comprises a plurality of receive antenna filters 140(1) to 140(N) and a combiner/detector 150. There is a receive antenna filter 140(i) coupled to an associated antenna 130(i). Each receive antenna filter 140(i) is, for example, a tapped delay-line filter having a number of taps, and is essentially a matched filter. A combiner/equalizer 150 is coupled to the receive antenna filters 140(1) to 140(N). The characteristic of each receive filter 140(i) is defined by a receive filter sub-vector $w^i_{R,D1}$ having a length corresponding to the number of taps of the receive antenna filters 140. The entry in each receive filter sub-vector $w^i_{R,D1}$ defines the corresponding complex tap weight for the delay-line filter. There are computation elements or blocks represented by reference numeral 160 in communication device 100 that perform discrete signal computations with respect to the transmit antenna filters 120 and receive antenna filters 140 described hereinafter.

Communication device 200 includes components similar to those in communication device 100. Communication device includes M plurality of antennas 210(1) to 210(M), a plurality of receive antenna filters 220(1) to 220(M) and a combiner/equalizer 230. There is a receive antenna filter 2200 (j) (i.e., a matched filter) associated with a corresponding antenna 210(j), where j is the antenna index for j=1 to M. The characteristic of each receive antenna filter 2200(j) is defined by a receive filter sub-vector $w^j_{R,D2}$. The receive filter sub-vectors can be grouped together to form a receive filter vector. On the transmit side, there is a transmit shaping filter 240 and a plurality of transmit antenna filters 250(1) to 250(M) each associated with a corresponding one of the antennas 210(1) to 210(M). The characteristic of each transmit antenna filter 250(j) is defined by a transmit filter sub-vector $w^j_{T,D2}$. Like communication device 100, the receive antenna filters 220(j) and the transmit antenna filters 250(j) are, for example, tapped delay-line filters of a number of taps. The length of the receive filter sub-vectors $w^j_{R,D2}$ correspond to the number of taps of the receive antenna filters 220(j), and the length of the transmit filter sub-vectors $w^j_{T,D2}$ correspond to the number of taps of the transmit antenna filters 250(j). Communication device 200 has computation elements or blocks represented by reference numeral 260 that perform discrete signal computations with respect to the transmit antenna filters 250(j) and receive antenna filters 220(j) described hereinafter. While FIG. 1 shows that communication devices 100 and 200 each have a plurality of antennas, it should be understood that one of them, for example, communication device 200, may have a single antenna (and therefore a single transmit antenna filter and a single receive antenna filter). In this case, only one of the two devices of the communication link adapts its transmit filter to optimize the receive SNR at the device with the single antenna. The device with multiple antennas will adapt its receive filter to optimize its receive SNR from the device with a single antenna.

The communication device block diagram shown in FIG. 1 is useful in a transceiver that processes signals of any wireless communication modulation standard or format. Likewise, the methods described herein are applicable to any wireless communication modulation standard or format. An example is a code division multiple access (CDMA) format using a single carrier. A more specific example is the single-carrier scheme of the IEEE 802.11b short-range wireless standard.

Figure 8:
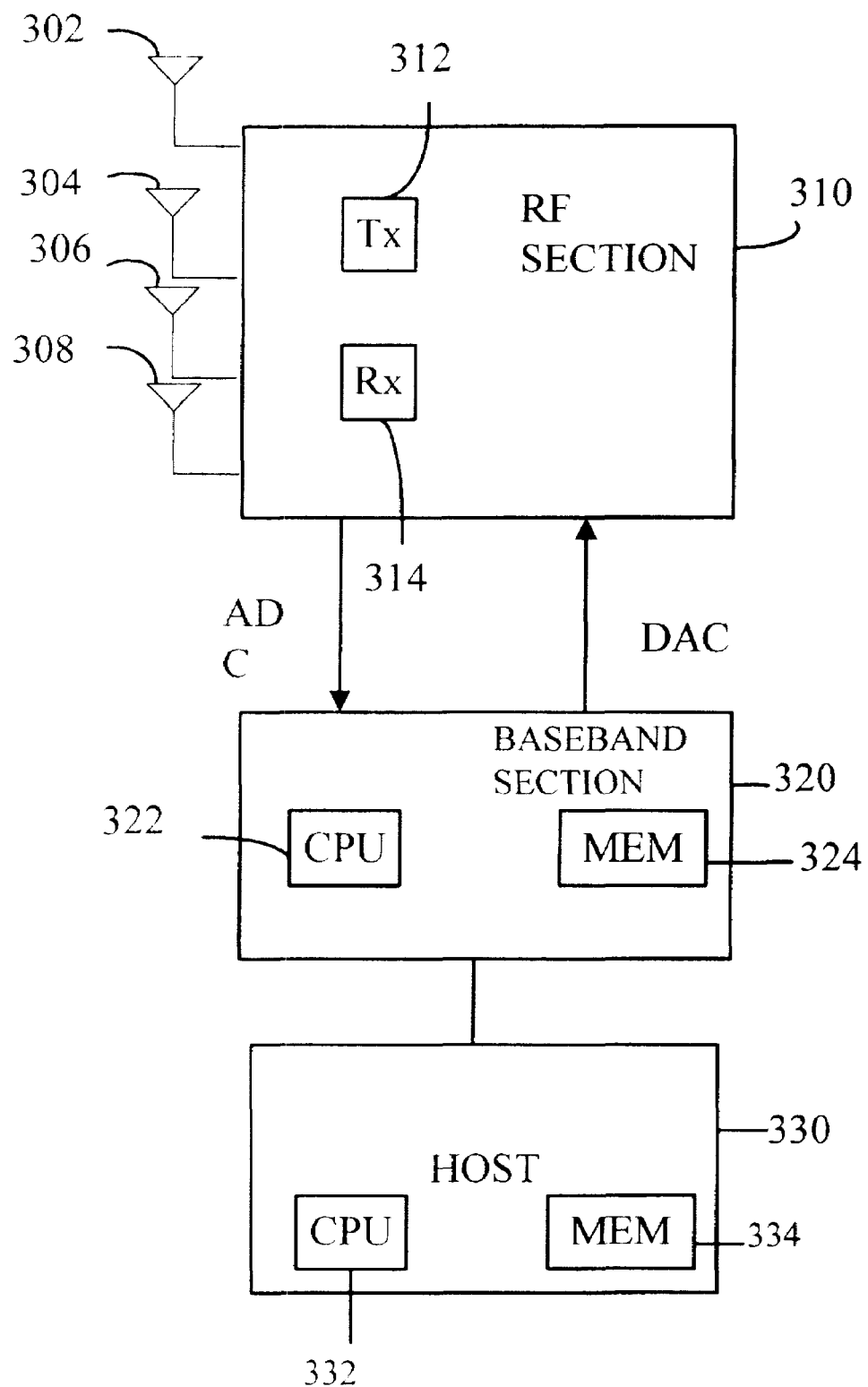
FIG. 8 is a block diagram of a communication device suitable for implementing the time-domain composite beamforming signal processing.

It should be understood to those of skill in the art that FIG. 1 is a simplification of a communication device architecture to highlight those components relevant to the composite beamforming techniques described herein. For example, FIG. 1 omits (for the sake of conciseness) digital-to-analog converters and a radio frequency (RF) section between the antennas and the antenna filters. FIG. 8, described hereinafter, is an example of a more complete exemplary block diagram of a communication device. The components shown in FIG. 1 are elements that typically are included in a baseband section of a communication device and may be implemented by discrete elements or by field programmable gate arrays for digital signal processing integrated circuit implementations. The combiner/equalizer 150 (and 230) is meant to represent any suitable signal processing components used in a receiver. For example, in the case of a decision feedback equalizer (DFE), the combiner/equalizer block includes feedforward filters, a decision block and a feedback filter. In the case of a maximum likelihood sequence estimator (MLSE) receiver, there is a MLSE in the combiner/equalizer block 150 (and 230), and in the case of a direct sequence spread spectrum (DSSS) receiver, there is a correlator in the combiner/equalizer block 150 (and 230).

When communication device 100 transmits a signal to communication device 200, the communication channel between the N plurality of antennas 130(1) to 130(N) and the M plurality of antennas 210(1) to 210(M) is defined by a channel matrix H of appropriate dimension as is shown in FIG. 2, described hereinafter. Similarly, when communication device 200 transmits a signal to communication device 100, the communication channel between the M plurality of antennas 210(1) to 210(M) and the N plurality of antennas 130(1) to 130(N) is defined by a channel matrix $H^T$.

Turning to FIG. 2, the channel matrix H is described in further detail. The channel response from an antenna i of communication device 100 to an antenna j of communication device 200 is defined by a channel response vector $h^{ij}$ and can be modeled as a tapped delay-line filter having a length or number of taps L. The channel response vector $h^{ij}$ can be written as shown in FIG. 2. The channel response vector can also be written as a convolution matrix $H_{ij}$, where i is the index for the N plurality of antennas of communication device 100 and j is the index for the M plurality of antennas of communication device 200. The dimensions of the channel response matrix $H_{ij}$ is (L+LTD1−1)×LTD1, where LTD1 is the length of the transmit filters of the first communication device 100.

Referring back to FIG. 1, the transmit antenna filters 120(i) in communication device 100 have a length (i.e., number of taps), and the transmit antenna filters 250(j) in communication device 200 have a length. The lengths of the transmit antenna filters 120(i) and 250(j) are not necessarily the same, and are chosen according to implementation/performance requirements. Obviously, the more taps a filter has, the greater performance it will have, at the expense of implementation cost and complexity. The length of the receive antenna filters 140(i) in communication device 100 depends on the length of the transmit antenna filters 250(j) and the length of the channel response vector $h^{ij}$ suitable for modeling the channel response between the first and second communication devices. It can be shown that the length of the receive antenna filters 140(i) (when receiving a signal from communication device 200) is equal to the sum of the length of the transmit antenna filters 250(j) plus the length of the channel response vector $h^{ij}$. Similarly, the length of the receive antenna filters 220(j) (when receiving a signal from communication device 100) is equal to the sum of the length of the transmit antenna filters 120(i) plus the length of the channel response vector $h^{ij}$. The length of the transmit antenna filters 120(i) and 250(j) do not depend on the length of the receive antenna filters 140(i) and 220(j), respectively, and can be set to any desired length. For example, it has been determined through simulation that transmit antenna filters 120(i) and 250(j) can be single tap delay-line filters and still achieve acceptable performance.

With reference to FIG. 3, similar to the channel matrix H, there is a transmit filter matrix $W^i_{T,D1}$ associated with each antenna i of the first communication device 100 (for transmitting a signal to the second communication device 200). A transmit filter super matrix is matrix comprising a plurality of sub-matrices corresponding to the transmit filter matrix associated with each antenna i. The transmit filter matrix $W^i_{T,D1}$ is a convolution matrix representation of the corresponding transmit antenna filter sub-vector $w^i_{T,D1}$. The transmit antenna filter vector $w_{T,D1}$ is essentially a super-vector comprised of a plurality of transmit filter sub-vectors $w^i_{T,D1}$, each transmit filter sub-vector corresponding to or associated with a transmit filter (FIG. 1), which in turn is associated with one of the plurality of antennas of the first communication device 100. For notation purposes, the length of each transmit filter sub-vector of communication device 100 is LTD1, as described above in conjunction with FIG. 2. Therefore, the length of the transmit antenna filter vector is N*LTD1. The dimensions of each transmit filter matrix is (LTD1+L−1)×L, and the dimension of each transmit filter sub-vector is LTD1×1.

Though not shown in FIG. 3, the transmit filter vector of the second communication device 200 (for transmitting a signal to the first communication device 100) is similarly defined as $w^j_{T,D2}$, associated with each antenna j of the second communication device 200. The length of the transmit antenna filter sub-vector (and thus the number of taps of the transmit antenna filters 250(j)) for the second communication device 200 is denoted LTD2. The receive filter matrix for the first communication device is denoted $W_{R,D1}$, and the receive filter matrix for the second communication device is denoted $W_{R,D2}$. Each receive filter matrix comprises a sub-matrix for each antenna of that device. Each sub-matrix is a convolution matrix derived from the receive filter sub-vector associated with the corresponding antenna depicted in FIG. 3. The filter length LTD1 of the first communication device and the filter length of LTD2 of the second communication device need not be the same.

Figure 4:
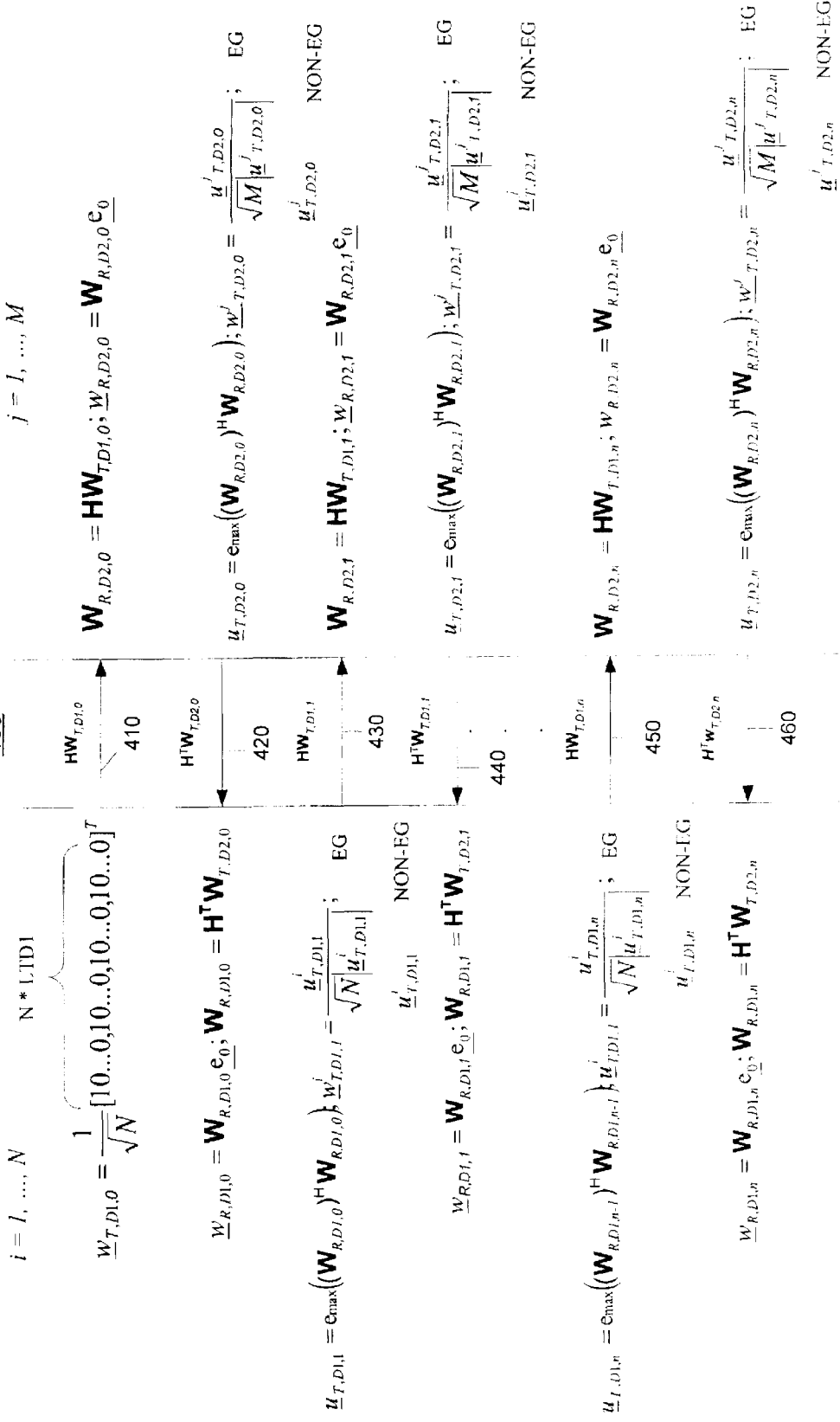
FIG. 4 is a flow diagram illustrating an iterative process for time-domain based composite beamforming between two communication devices.

FIG. 4 illustrates the iterative process 400. The process 400 is described with respect to communication between the first communication device (denoted by the index D1) having N antennas and the second communication device (denoted by the index D2) having M antennas. It is to be understood that the process is applicable to any wireless communication application, such as, for example, a short-range wireless application. The process begins in step 410 when the first communication device transmits a signal to the second communication device using an initial transmit filter vector $w_{T,D1,0}=[10\ldots 0,10\ldots 0,10\ldots 0,10\ldots 0]^T$ according to the notation shown, normalized by the factor $1/(N)\%^{1/2}$ (1 divided by the square root of N), where N is the number of antennas of the first communication device. The purpose of this factor will be described hereinafter. The initial transmit filter vector has a unity value at the initial position in each sub-vector for each antenna. In step 410, the first communication device transmits a signal with the initial transmit filter vector to the second communication device. The second communication device receives the transmitted signal, and from the received signal, the second communication device estimates a vector corresponding to the product $W_{R,D2,0}e_0$, where $e_0$ is the vector $[10\ldots 0]^T$. From this quantity, the second communication device obtains the initial receive filter vector $w_{R,D2,0}$ and builds the receive filter matrix $w_{R,D2,0}$ with dimensions that, after further computations, will result in a transmit filter vector $w_{T,D2}$ that has the desired filter length.

In step 420, the second communication device computes a principal eigenvector $u_{T,D2}$ which is the eigenvector corresponding to the maximum eigenvalue of the product of $\{(W_{R,D2,0})^H W_{R,D2,0}\}$. The principal eigenvector $u_{T,D2,0}$ has a length of M*LTD2. The principal eigenvector $u_{T,D2,0}$ is a super vector, or vector of sub-vectors, where each sub-vector $u^j_{T,D2,0}$ has a length LTD2 and is used to derive the transmit antenna filter sub-vector $w^j_{T,D2,0}$ for a corresponding antenna of the second communication device.

Each transmit filter sub-vector $w^j_{T,D2}$ can take on one of two values as shown in FIG. 4. In one case, the transmit filter sub-vector $w^j_{T,D2}$ is equal to the corresponding sub-vector $u^j_{T,D2}$ of the principal eigenvector $u_{T,D20}$. This is called the non-equal gain case indicated "NON-EG" in FIG. 4. In another case, the transmit antenna sub-vector $w^j_{T,D2}$ is equal to the corresponding sub-vector $u^j_{T,D2,0}$ of the principal eigenvector $u_{T,D2,0}$ divided by the norm of that sub-vector $u^j_{T,D2,0}$ and by $(M)^{1/2}$ (square root of M). This case is called the equal-gain case, indicated "EG" in FIG. 4. This further computation equal-gain normalizes the magnitude of each filter sub-vector so that the power of the signal transmitted at each antenna using the transmit filter sub-vectors is equal. This equal gain constraint is advantageous because it has been found to yield performance very close to non-equal gain antenna processing (within 1-2 dB), but substantially reduces the power output requirements for each power amplifier associated with each antenna. The advantages of equal-gain composite beamforming are further described in the aforementioned co-pending application entitled "System and Method for Antenna Diversity Using Equal Gain Joint Maximal Ratio Combining." The initial transmit filter subvectors used by the first communication device in step 410 can optionally be equal gain normalized, as indicated in FIG. 4 with the $(N)^{1/2}$ factor.

In step 420, the first communication device receives the signal transmitted by the second communication device using the transmit sub-vectors $w^j_{T,D2}$ and estimates a vector corresponding to the product $W_{R,D1,0}e_0$ to obtain the initial receive filter vector $w_{R,D1,0}$. At the next iteration in step 430, the first communication device performs a process similar to the one performed by the second communication device in step 420, to compute the principal eigenvector $u_{T,D1,1}$ and generate therefrom updated transmit filter sub-vectors for each antenna of the first communication device using either the equal gain computation or non-equal gain relationship.

Steps 440 and 450 show that this process repeats and the transmit filter sub-vectors at the first and second communication devices converge to values that optimize the received SNR at each of them. The transmit filter subvectors computed at each iteration are stored. Even though the transmit filter sub-vectors will ultimately converge after several iterations, they can be continuously updated with each transmission between those communication devices beyond convergence. In addition, it may also be desirable to store the most recent or updated transmit filter sub-vectors in one communication device against and identifier of the particular destination communication device. In this way, when a subsequent communication session is initiated between those same communication devices, each device can retrieve the stored transmit filter sub-vectors for use in transmitting signals to the other device.

Optimizing the transmit filters at the first and second communication device in this way significantly increases the range (i.e., distance) between the devices. This can be very advantageous in a wireless communication environments, such as short-range wireless applications. A wireless LAN is one example of a short-range wireless application.

The computations referred to in the description of the iterative process 400 may be performed by the discrete signal computation blocks 160 and 260 (using digital signal processing techniques), respectively, in communication devices 100 and 200. For example, when communication device 100 or 200 receives a signal from the other device, there is a channel estimator computation block that estimates the composite channel transmit filter response of the transmitting communication device in order to determine the receive super matrix $W_R$. There is a computation block that forms the receive vector $w_R$ and from that vector builds the receive convolution matrix $W^j_R$ for each antenna. There are also one or more computation blocks that compute super matrix $W_R$, the Hermitian of the receive super matrix $W_R$, multiply it with the receive matrix $W_R$ and compute the principle or principal eigenvector of the matrix product of that matrix multiplication. Computation blocks are also provided that normalize each sub-vector (divide by the norm of the principal eigenvectors and by the square-root of the number of antennas) for each antenna sub-vector. Moreover, the transmit antenna filters and receive antenna filters in each communication device may similarly be implemented by computational blocks.

Figure 5:
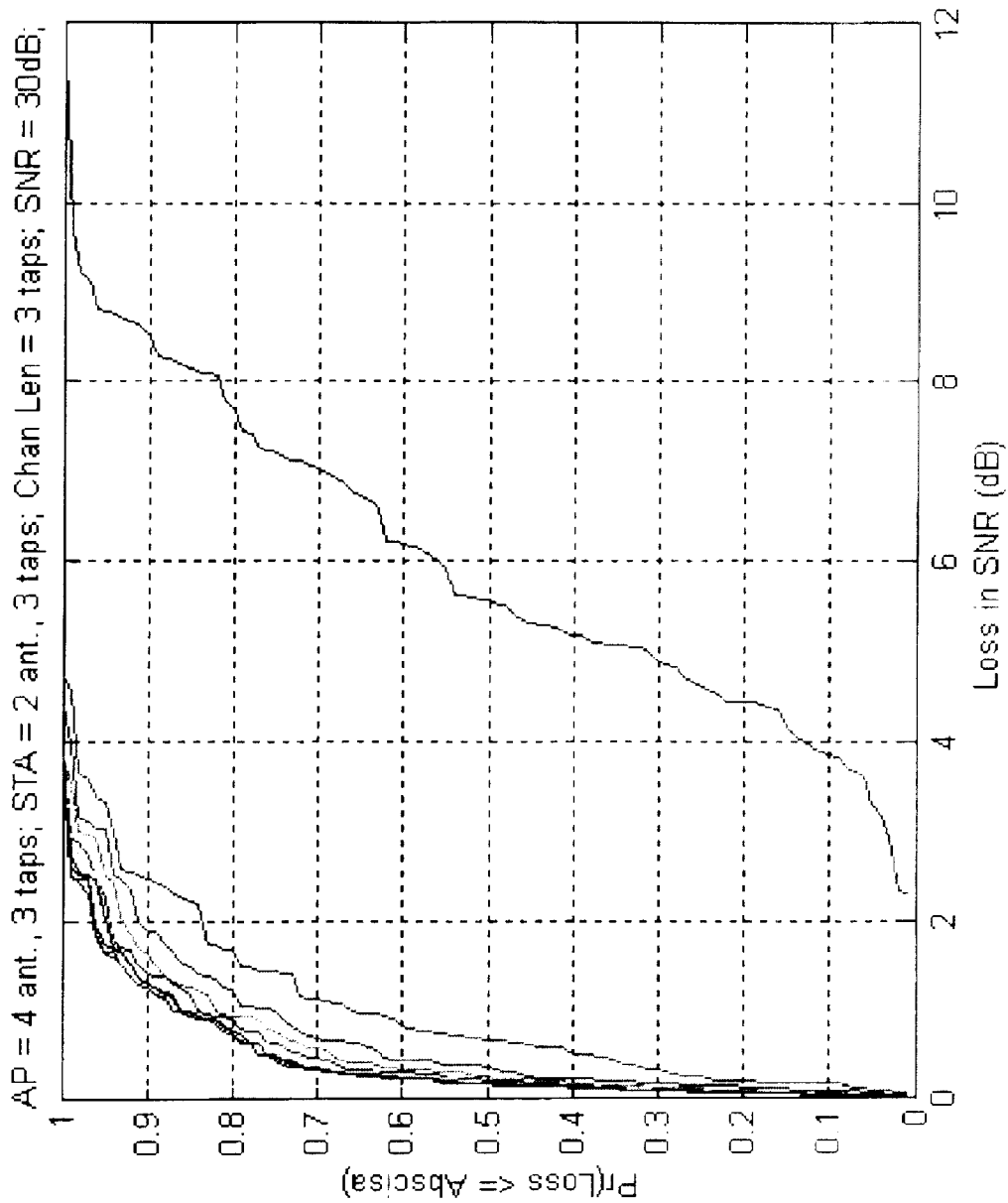
FIG. 5 is a graphical diagram showing exemplary results of the time-domain based iterative process.
Figure 6:
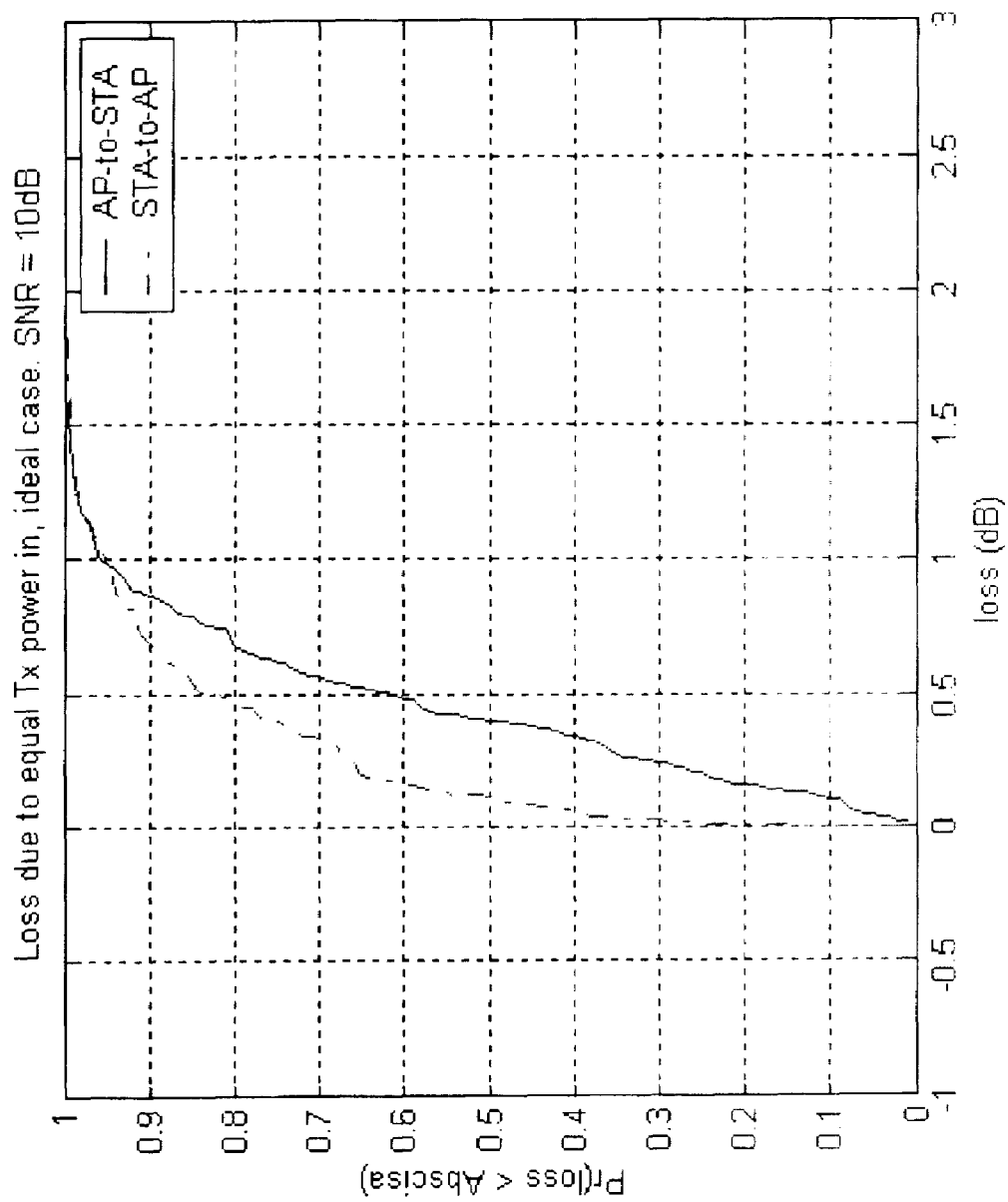
FIG. 6 is a graphical diagram showing performance loss for ideal channel conditions.
Figure 7:
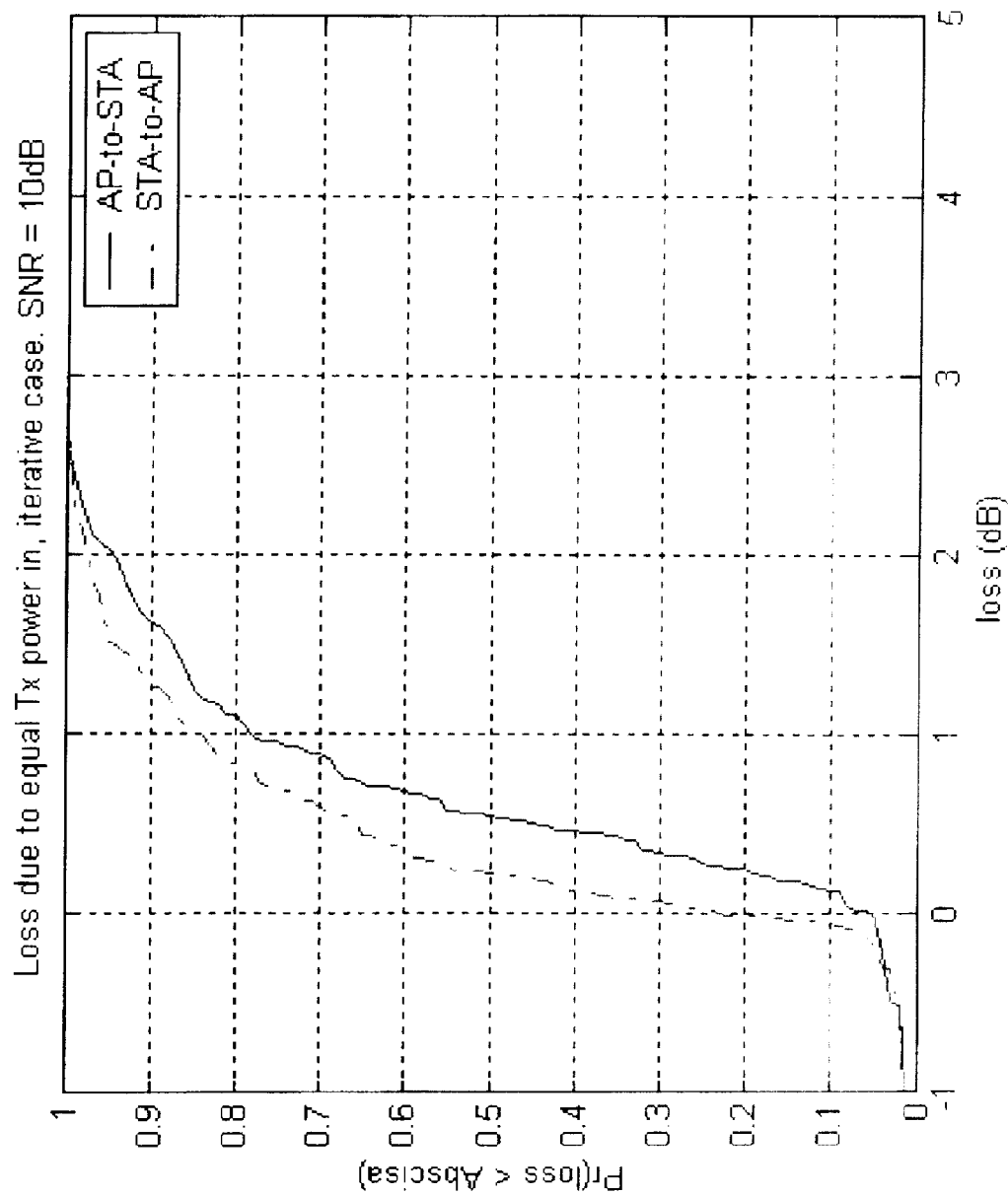
FIG. 7 is a graphical diagram showing performance loss for the iterative process.

FIGS. 5 to 7 show various performance metrics of the iterative scheme. FIG. 5 shows the loss in SNR of the iterative scheme of FIG. 4 relative to the case where the channel state is known at the transmitting device (hereinafter called the "ideal case"). The loss in SNR due to the iterative scheme is less than 2 dB for more than 90% of channel realizations.

FIG. 6 shows loss in SNR using the equal gain constraint in the ideal case relative to the non-equal gain ideal case. That is, both communication devices, when transmitting to the other device, constrain the power of the signal at each antenna to be equal. The loss in SNR for the equal gain case is less than 1 dB for more than 90% of channel realizations.

FIG. 7 shows the loss in SNR using the equal gain constraint in the iterative scheme of FIG. 4. The loss in SNR using equal gain is less than 1 dB for more than 90% of channel realizations.

FIG. 8 shows a more complete exemplary block diagram of a communication device useful in accordance with the techniques described herein. The communication devices at both ends of the link, i.e., devices 100 and 200 may have any known suitable architecture to transmit, receive and process signals. An example of a communication device block diagram is shown in FIG. 8. The communication device comprises an RF section 310, a baseband section 320 and optionally a host 330. There are a plurality of antennas, e.g., four antennas 302, 304, 306, 308 coupled to the RF section 310 that are used for transmission and reception. The RF section 310 has a transmitter (Tx) 312 that upconverts baseband signals for transmission, and a receiver (Rx) 314 that downconverts received RF signals for baseband processing. In the context of the composite beamforming techniques described herein, the Tx 312 upconverts and supplies separately weighted signals to corresponding ones of each of the plurality of antennas via separate power amplifiers. Similarly, the Rx 314 downconverts and supplies received signals from each of the plurality of antennas to the baseband section 320. The baseband section 320 performs processing of baseband signals to recover the information from a received signal, and to convert information in preparation for transmission. The baseband section 320 may implement any of a variety of communication formats or standards, such as WLAN standards IEEE 802.11x, frequency hopping standards such as Bluetooth™, as well as other protocol standards, not necessarily used in a WLAN. In the case of frequency hopping systems, the antenna sub-vectors are computed and stored for each frequency in a frequency hopping sequence.

The intelligence to execute the computations for the composite beamforming techniques described herein may be implemented in a variety of ways. For example, a processor 322 in the baseband section 320 may execute instructions encoded on a processor readable memory 324 (RAM, ROM, EEPROM, etc.) that cause the processor 322 to perform the composite beamforming steps described herein. Alternatively, as suggested above, an application specific integrated circuit (ASIC) may be fabricated with the appropriate firmware e.g., field programmable gate arrays (FPGAs), configured to execute the computations described herein. This ASIC may be part of, or the entirety of, the baseband section 320. For example, the components shown in FIG. 1 as part of the communication devices may be implemented by FPGAs in the baseband section 320. Still another alternative is for the beamforming computations to be performed by a host processor 332 (in the host 330) by executing instructions stored in (or encoded on) a processor readable memory 334. The RF section 310 may be embodied by one integrated circuit, and the baseband section 320 may be embodied by another integrated circuit. The communication device on each end of the communication link need not have the same device architecture or implementation.

To summarize, a method is provided for communicating signals between a first communication device and a second communication device using radio frequency (RF) communication techniques. At the first communication device there are steps of generating a transmit filter vector for processing a signal to be transmitted from the first communication device to the second communication device, the transmit filter vector comprised of a plurality of transmit filter sub-vectors defining one or more complex weights associated with a transmit tapped-delay line filter, each transmit filter sub-vector associated with a corresponding one of a plurality of antennas of the first communication device and having a length corresponding to the number taps of the associated transmit tapped-delay line filter; and applying the transmit filter vector to a signal to be transmitted from the first communication device to the second communication device.

At the second communication device there are steps of generating a receive filter matrix from a signal received by the one or more antennas of the second communication device from the first communication device, the receive filter matrix comprised of one or more sub-matrices each being a convolution matrix derived from a receive filter sub-vector, wherein each receive filter sub-vector defines one or more complex weights associated with a receive tapped-delay line filter for the one or more antennas of the second communication device; computing a principal eigenvector of a product of the receive filter matrix and a Hermitian of the receive filter matrix, the principal eigenvector comprised of one or more sub-vectors each having a length corresponding to a number of taps of a transmit tapped-delay line filter associated with the one or more antennas of the second communication device; deriving from the one or more sub-vectors of the principal eigenvector one or more transmit filter sub-vectors that form a transmit filter vector, each transmit filter sub-vector corresponding to the one or more antennas of the second communication device and defining one or more complex weights associated with the transmit tapped-delay line filter for the one or more antennas of the second communication device; and applying the transmit filter vector at the second communication device to a signal to be transmitted from the second communication device to the first communication device. The transmit filter vector at either or both of the first and second communication devices may be normalized at each sub-vector so that the total power associated with a transmitted signal is divided equally among the plurality of antennas of the first communication device.

Similarly, a method is provided for radio communication between a first communication device and a second communication device, comprising steps of generating a transmit filter vector for processing a signal to be transmitted from the first communication device to the second communication device, the transmit filter vector comprised of a plurality of transmit filter sub-vectors defining one or more complex weights associated with a transmit tapped-delay line filter, each transmit filter sub-vector associated with a corresponding one of a plurality of antennas of the first communication device and having a length corresponding to the number taps of the associated transmit tapped-delay line filter; applying the transmit filter vector to a signal to be transmitted from the first communication device to the second communication device; generating a receive filter matrix from a signal received by the plurality of antennas of the first communication device from the second communication device, the receive filter matrix comprised of a plurality of sub-matrices each being a convolution matrix derived from a receive filter sub-vector, wherein each receive filter sub-vector defines one or more complex weights associated with a receive tapped-delay line filter process for the each of the plurality of antennas of the first communication device; computing a principal eigenvector of a product of the receive filter matrix and a Hermitian of the receive filter matrix, the principal eigenvector comprised of a plurality of sub-vectors each having a length corresponding to the number of taps of the transmit tapped-delay line filter process of the first communication device; and updating from the plurality of sub-vectors of the principal eigenvector the plurality of transmit filter sub-vectors. This method may be implemented by instructions encoded on a medium, such as a processor readable medium, or by instructions implemented by one or more arrays of field programmable gates.

Further still, a semiconductor device is provided comprising a plurality of field programmable gates configured to implement: a plurality of transmit tapped delay-line filters, each associated with a corresponding one of a plurality of antennas; a plurality of receive tapped delay-line filters, each associated with a corresponding one of the plurality of antennas; and one or more computation blocks that generate a transmit filter vector for processing a signal to be transmitted to another communication device, the transmit filter vector comprised of a plurality of transmit filter sub-vectors defining one or more complex weights associated with the transmit tapped-delay line filter, each transmit filter sub-vector associated with a corresponding one of the plurality of antennas and having a length corresponding to the number taps of the associated transmit tapped-delay line filter; apply the transmit filter vector to a signal to be transmitted from the other communication device; generate a receive filter matrix from a signal received by the plurality of antennas from the other communication device, the receive filter matrix comprised of a plurality of sub-matrices each being a convolution matrix derived from a receive filter sub-vector, wherein each receive filter sub-vector defines one or more complex weights associated with a receive tapped-delay line filter process for the each of the plurality of antennas; compute a principal eigenvector of a product of the receive filter matrix and a Hermitian of the receive filter matrix, the principal eigenvector comprised of a plurality of sub-vectors each having a length corresponding to the number of taps of the transmit tapped-delay line filter process; and update from the plurality of sub-vectors of the principal eigenvector the plurality of transmit filter sub-vectors. The semiconductor device may be, for example, an digital application specific integrated circuit implemented using field programmable gate arrays or digital logic implementations, such as CMOS digital logic.

The above description is intended by way of example only.

The invention claimed is:

1. A method for communicating signals using radio frequency (RF) communication techniques, the method comprising:

generating a receive filter matrix from a signal received by a plurality of antennas of a first communication device from a second communication device, the receive filter matrix comprised of a plurality of sub-matrices each being a convolution matrix derived from a receive filter sub-vector, wherein each receive filter sub-vector defines complex weights associated with a receive tapped-delay line filter for a corresponding one of the plurality of antennas of the first communication device;

computing a principal eigenvector of a product of the receive filter matrix and a Hermitian of the receive filter matrix, the principal eigenvector comprised of a plurality of sub-vectors each having a length corresponding to a number of taps of a transmit tapped-delay line filter associated with a corresponding one of the plurality of antennas of the first communication device;

generating from the plurality of sub-vectors of the principal eigenvector a plurality of transmit filter sub-vectors that form a transmit filter vector, each transmit filter sub-vector associated with a corresponding one of the plurality of antennas of the first communication device and defining complex weights associated with the transmit tapped-delay line filter for a corresponding one of the plurality of antennas of the first communication device; and applying the transmit filter vector at the first communication device to a signal to be transmitted from the first communication device to the second communication device.

2. The method of claim 1, wherein the generating the plurality of transmit filter sub-vectors comprises equating each transmit filter sub-vector to the corresponding sub-vector of the principal eigenvector.

3. The method of claim 1, wherein the generating the transmit filter vector further comprises normalizing each sub-vector of the transmit filter vector so that a total power emitted is divided equally among the plurality of antennas of the first communication device.

4. The method of claim 3, wherein the normalizing comprises computing the norm of each of the plurality of sub-vectors of the principal eigenvector and dividing each sub-vector of the principal eigenvector by the norm and by the square root of the number of plurality of antennas of the first communication device.

5. The method of claim 1, wherein the generating the receive filter matrix, the computing the principal eigenvector, and the generating the plurality of transmit filter sub-vectors are performed each time a signal is received at the first communication device from the second communication device to update the transmit filter vector and the applying the transmit filter vector is performed with the updated filter vector when subsequently transmitting a signal to the second communication device.

6. A processor-readable medium, having encoded thereon instructions that, when executed by the processor, perform functions comprising:

generating a receive filter matrix from a signal received by a plurality of antennas of a first communication device from a second communication device, the receive filter matrix comprised of a plurality of sub-matrices each being a convolution matrix derived from a receive filter sub-vector, wherein each receive filter sub-vector defines complex weights associated with a receive tapped-delay line filter for a corresponding one of the plurality of antennas of the first communication device;

computing a principal eigenvector of a product of the receive filter matrix and a Hermitian of the receive filter matrix, the principal eigenvector comprised of a plurality of sub-vectors each having a length corresponding to a number of taps of a transmit tapped-delay line filter associated with a corresponding one of the plurality of antennas of the first communication device;

generating from the plurality of sub-vectors of the principal eigenvector a plurality of transmit filter sub-vectors that form a transmit filter vector, each transmit filter sub-vector associated with a corresponding one of the plurality of antennas of the first communication device and defining complex weights associated with the transmit tapped-delay line filter for a corresponding one of the plurality of antennas of the first communication device; and applying the transmit filter vector at the first communication device to a signal to be transmitted from the first communication device to the second communication device.

7. The medium of claim 6, wherein the instructions encoded on the medium for performing the function of generating the plurality of transmit filter sub-vectors comprise instructions for equating each transmit filter sub-vector to the corresponding sub-vector of the principal eigenvector.

8. The medium of claim 6, wherein the instructions encoded on the medium for performing the function of generating the transmit filter sub-vectors further comprise instructions for normalizing each sub-vector of the transmit filter vector so that a total power emitted is divided equally among the plurality of antennas of the first communication device.

9. The medium of claim 8, wherein the instructions encoded on the medium for performing the function of normalizing comprise instructions that compute the norm of each of the plurality of sub-vectors of the principal eigenvector and divide each sub-vector of the principal eigenvector by the norm and by the square root of the number of plurality of antennas of the first communication device.

10. The medium of claim 6, and further comprising instructions encoded on the medium that repeat functions of generating the receive filter matrix, the computing the principal eigenvector, and generating the plurality of transmit filter sub-vectors, each time a signal is received at the first communication device from the second communication device to update the transmit filter vector and wherein the function of applying the transmit filter vector is performed with the updated transmit filter vector when subsequently transmitting a signal to the second communication device.

11. The medium of claim 6, wherein the instructions are implemented by one or more arrays of gates.

12. A baseband signal processing integrated circuit device comprising the one or more arrays of gates of claim 11.

13. A communication device comprising the baseband signal processing integrated circuit device of claim 12, and further comprising:

a transmitter coupled to the baseband signal processing integrated circuit and to be coupled to the plurality of antennas to up convert transmit signals generated by the baseband signal processing integrated circuit for transmission via respective ones of the plurality of antennas; and a receiver coupled to the baseband signal processing integrated circuit and to be coupled to the plurality of antennas to down convert signals received by the plurality of antennas and to produce receive signals that are coupled to the baseband signal processing integrated circuit.

14. The medium of claim 6, wherein the instructions are processor readable instructions, that when executed by a processor, cause the processor to perform the generating the receive filter matrix, the computing the principal eigenvector, the generating the plurality of transmit filter sub-vectors, and the applying the transmit filter vector.

15. A semiconductor device comprising a plurality of gates configured to implement:

a plurality of transmit tapped delay-line filters, each associated with a corresponding one of a plurality of antennas;

a plurality of receive tapped delay-line filters, each associated with a corresponding one of the plurality of antennas;

one or more computation blocks that:

generate a receive filter matrix from a signal received by the plurality of antennas of a communication device from another communication device, the receive filter matrix comprised of a plurality of sub-matrices each being a convolution matrix derived from a receive filter sub-vector, wherein each receive filter sub-vector defines complex weights associated with a corresponding receive tapped-delay line filter;

compute a principal eigenvector of a product of the receive filter matrix and a Hermitian of the receive filter matrix, the principal eigenvector comprised of a plurality of sub-vectors each having a length corresponding to a number of taps of a corresponding transmit tapped-delay line filter;

generate from the plurality of sub-vectors of the principal eigenvector a plurality of transmit filter sub-vectors that form a transmit filter vector, each transmit filter sub-vector associated with a corresponding one of the plurality of antennas of the first communication device and defining complex weights associated with a corresponding transmit tapped-delay line filter; and apply the transmit filter vector at the communication device to a signal to be transmitted to the other communication device.

16. The semiconductor device of claim 15, wherein the computation blocks generate the plurality of transmit sub-vectors by equating each transmit filter sub-vector to the corresponding sub-vector of the principal eigenvector.

17. The semiconductor device of claim 15, wherein the computation blocks generate the transmit filter sub-vectors by normalizing each sub-vector of the transmit filter vector so that a total power emitted is divided equally among the plurality of antennas of the communication device.

18. The semiconductor device of claim 17, wherein the computation blocks normalize each sub-vector of the transmit filter vector by computing the norm of each of the plurality of sub-vectors of the principal eigenvector and dividing each sub-vector of the principal eigenvector by the norm and by the square root of the number of plurality of antennas of the communication device.

19. The semiconductor device of claim 15, wherein the computation blocks repeat the computations that generate the receive filter matrix; that compute the principal eigenvector; and that generate the plurality of transmit filter sub-vectors each time a signal is received at the communication device from the other communication device to update the transmit filter vector, and wherein the computation that applies the transmit filter vector is performed with the updated transmit filter vector when subsequently transmitting a signal to the other communication device.

20. A radio communication device comprising the semiconductor device of claim 15, and further comprising:

a plurality of antennas;

a transmitter coupled to the plurality of antennas and to the semiconductor device to up convert transmit signals generated by the semiconductor device for transmission via respective ones of the plurality of antennas; and a receiver coupled to the plurality of antennas and to the semiconductor device to down convert signals received by the plurality of antennas and produce receive signals that are coupled to the semiconductor device.

21. A method for communicating signals using radio frequency (RF) communication techniques, comprising:

processing with a transmit filter vector a signal to be transmitted from a first communication device via a plurality of antennas of the first communication device to a second communication device, the transmit filter vector comprised of a plurality of transmit filter sub-vectors defining one or more complex weights associated with a transmit tapped-delay line filter, each transmit filter sub-vector associated with a corresponding one of the plurality of antennas of the first communication device and having a length corresponding to the number taps of the associated transmit tapped-delay line filter; and processing with a receive filter matrix a signal received from the second communication device at the plurality of antennas of the first communication, wherein the receive filter matrix comprises a plurality of sub-matrices each being a convolution matrix derived from a receive filter sub-vector, wherein each receive filter sub-vector defines complex weights associated with a receive tapped-delay line filter for a corresponding one of the plurality of antennas of the first communication device; and computing a principal eigenvector of a product of the receive filter matrix and a Hermitian of the receive filter matrix, the principal eigenvector comprised of a plurality of sub-vectors each having a length corresponding to the number of taps of the transmit tapped-delay line filter of the first communication device.

22. The method of claim 21, wherein when a signal is received at the plurality of antennas of the first communication device from the second communication device, further comprising:

updating the transmit filter sub-vectors with the plurality of sub-vectors of the principal eigenvector for use when transmitting a signal to the second communication device.

23. The method of claim 22 further comprising:

computing the norm of each of a plurality of sub-vectors of the principal eigenvector and dividing each sub-vector of the principal eigenvector by the norm and by the square root of the number of plurality of antennas of the first communication device so that when the transmit filter vector is applied to a signal to be transmitted, a total power emitted is divided equally among the plurality of antennas of the first communication device.

24. A processor-readable medium, having encoded thereon instructions that, when executed by the processor, perform functions comprising:

processing with a transmit filter vector a signal to be transmitted from a first communication device via a plurality of antennas of the first communication device to a second communication device, the transmit filter vector comprised of a plurality of transmit filter sub-vectors defining one or more complex weights associated with a transmit tapped-delay line filter, each transmit filter sub-vector associated with a corresponding one of the plurality of antennas of the first communication device and having a length corresponding to the number taps of the associated transmit tapped-delay line filter;

processing with a receive filter matrix a signal received from the second communication device at the plurality of antennas of the first communication, wherein the receive filter matrix comprises a plurality of sub-matrices each being a convolution matrix derived from a receive filter sub-vector, wherein each receive filter sub-vector defines complex weights associated with a receive tapped-delay line filter for a corresponding one of the plurality of antennas of the first communication device; and computing a principal eigenvector of a product of the receive filter matrix and a Hermitian of the receive filter matrix when a signal is received at the plurality of antennas of the first communication device from the second communication device, the principal eigenvector comprised of a plurality of sub-vectors each having a length corresponding to the number of taps of the transmit tapped-delay line filter of the first communication device.

25. The medium of claim 24, and further comprising instructions encoded on the medium to further perform a function of:

updating the transmit filter sub-vectors with the plurality of sub-vectors of the principal eigenvector for use when transmitting a signal to the second communication device.

26. The medium of claim 25, wherein the instructions encoded on the medium for performing the function of computing a principal eigenvector further comprise instructions for computing the norm of each of a plurality of sub-vectors of the principal eigenvector and dividing each sub-vector of the principal eigenvector by the norm and by the square root of the number of plurality of antennas of the first communication device so that when the transmit filter vector is applied to a signal to be transmitted, a total power emitted is divided equally among the plurality of antennas of the first communication device.

27. The medium of claim 24, wherein the instructions are implemented by one or more arrays of gates.

28. A baseband signal processing integrated circuit device comprising the one or more arrays of gates of claim 27.

29. A communication device comprising the baseband signal processing device of claim 28, and further comprising:

a transmitter coupled to the baseband signal processing integrated circuit and to be coupled to the plurality of antennas to up convert transmit signals generated by the baseband signal processing integrated circuit for transmission via respective ones of the plurality of antennas; and a receiver coupled to the baseband signal processing integrated circuit and to be coupled to the plurality of antennas to down convert signals received by the plurality of antennas and to produce receive signals that are coupled to the baseband signal processing integrated circuit.

30. The medium of claim 24, wherein when the instructions are executed by a processor, cause the processor to perform the functions of:

processing with the transmit filter vector the signal to be transmitted from the first communication device via the plurality of antennas of the first communication device to the second communication device, the transmit filter vector comprised of the plurality of transmit filter sub-vectors defining one or more complex weights associated with the transmit tapped-delay line filter, each transmit filter sub-vector associated with the corresponding one of the plurality of antennas of the first communication device arid having the length corresponding to the number taps of the associated transmit tapped-delay line filter; and processing with the receive filter matrix the signal received from the second communication device at the plurality of antennas of the first communication, wherein the receive filter matrix comprises the plurality of sub-matrices each being the convolution matrix derived from the receive filter sub-vector, wherein each receive filter sub-vector defines complex weights associated with the receive tapped-delay line filter for the corresponding one of the plurality of antennas of the first communication device.

31. A radio communication device comprising:

N plurality of antennas;

a baseband signal processor that generates transmit signals and that recovers data from receive signals; and a radio transceiver coupled to the baseband signal processor that up converts the transmit signals for transmission via the N plurality of antennas and down converts signals received by the N plurality of antennas to produce receive signals;

wherein the baseband signal processor:

processes with a transmit filter vector a signal to be transmitted from via the N plurality of antennas to another communication device, the transmit filter vector comprised of a plurality of transmit filter sub-vectors defining one or more complex weights associated with a transmit tapped-delay line filter, each transmit filter sub-vector associated with a corresponding one of the N plurality of antennas and having a length corresponding to the number taps of the associated transmit tapped-delay line filter;

processes with a receive filter matrix a signal received at the N plurality of antennas from the other communication device, wherein the receive filter matrix comprises a plurality of sub-matrices each being a convolution matrix derived from a receive filter sub-vector, wherein each receive filter sub-vector defines complex weights associated with a receive tapped-delay line filter for a corresponding one of the N plurality of antennas; and computes a principal eigenvector of a product of the receive filter matrix and a Hermitian of the receive filter matrix, the principal eigenvector comprised of a plurality of sub-vectors each having a length corresponding to the number of taps of the transmit tapped-delay line filter of the radio communication device.

32. The radio communication device of claim 31, wherein the baseband signal processor updates the transmit filter sub-vectors with the plurality of sub-vectors of the principal eigenvector for use when transmitting a signal to the other communication device.

* * * * *

UNITED STATES PATENT AND TRADEMARK OFFICE
CERTIFICATE OF CORRECTION

PATENT NO. : 7,573,945 B2  Page 1 of 1
APPLICATION NO. : 10/707588
DATED : August 11, 2009
INVENTOR(S) : Tesfai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1580 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,573,945 B2
APPLICATION NO. : 10/707588
DATED : August 11, 2009
INVENTOR(S) : Tesfai et al.

It is certified that error appears in the above-identified patent and that said Letters Patent is hereby corrected as shown below:

At item (56), U.S. PATENT DOCUMENTS, page 3, line 10, left column, after line beginning with "2004/0104839", insert --2004/0013212 1/2004 Benesty et al.--.

At item (56), OTHER PUBLICATIONS, page 3, line 43, left column, after line beginning with "Measurements at 5 GHz", delete "Irner." and insert therefor --Irmer,--.

At item (56), OTHER PUBLICATIONS, page 5, line 12, left column, after line beginning with "ITG Fokusprojekt", after "Antennen" delete "lienau" and insert therefor --Ilmenau--.

At column 6, line 37, after the word "factor" delete "1/(N)%1/2" and insert therefor --1/(N)1/2--.

At column 6, line 65, before the words "of the" delete "ujT,D2" and insert therefor --ujT,D2,0--.

At claim 8, column 12, line 22, before the word "plurality" delete "among-the" and insert therefor --among the--.

At claim 30, column 16, line 4, before the word "having" delete "arid" and insert therefor --and--.

Signed and Sealed this
Fifteenth Day of March, 2011

David J. Kappos
*Director of the United States Patent and Trademark Office*